(12) United States Patent
Huang

(10) Patent No.: US 11,194,125 B2
(45) Date of Patent: Dec. 7, 2021

(54) IRIS LENS ASSEMBLY

(71) Applicant: Zhejiang Sunny Optical Co., Ltd, Ningbo (CN)

(72) Inventor: Lin Huang, Ningbo (CN)

(73) Assignee: ZHEJIANG SUNNY OPTICAL CO., LTD., Ningbo (CN)

( * ) Notice: Subject to any disclaimer, the term of this patent is extended or adjusted under 35 U.S.C. 154(b) by 578 days.

(21) Appl. No.: 16/074,733

(22) PCT Filed: Oct. 26, 2017

(86) PCT No.: PCT/CN2017/107846
§ 371 (c)(1),
(2) Date: Aug. 1, 2018

(87) PCT Pub. No.: WO2018/214397
PCT Pub. Date: Nov. 29, 2018

(65) Prior Publication Data
US 2021/0048618 A1 Feb. 18, 2021

(30) Foreign Application Priority Data

May 26, 2017 (CN) .......................... 201710386419.9
May 26, 2017 (CN) .......................... 201720600534.7

(51) Int. Cl.
*G02B 9/12* (2006.01)
*G02B 13/18* (2006.01)
*G02B 13/00* (2006.01)
*G02B 5/20* (2006.01)
*G02B 27/00* (2006.01)

(52) U.S. Cl.
CPC ......... *G02B 13/0035* (2013.01); *G02B 5/208* (2013.01); *G02B 9/12* (2013.01); *G02B 27/0025* (2013.01)

(58) Field of Classification Search
CPC ...... G02B 13/0035; G02B 5/208; G02B 9/12; G02B 27/0025
USPC ................................ 359/716, 753, 784, 785
See application file for complete search history.

(56) References Cited

U.S. PATENT DOCUMENTS

| 8,462,449 | B2 | 6/2013 | Hsu et al. |
| 9,658,431 | B1 | 5/2017 | Tang et al. |
| 9,726,854 | B2 | 8/2017 | Liu et al. |
| 9,810,879 | B2 | 11/2017 | Jang et al. |

(Continued)

FOREIGN PATENT DOCUMENTS

| CN | 201993515 U | 9/2011 |
| CN | 102269860 A | 12/2011 |

(Continued)

*Primary Examiner* — William Choi
(74) *Attorney, Agent, or Firm* — Hauptman Ham, LLP

(57) ABSTRACT

The present disclosure discloses an iris lens assembly, having a total effective focal length f, and the iris lens assembly comprises sequentially a first lens, a second lens and a third lens from an object side to an image plane along an optical axis. The first lens has a positive refractive power, and an object-side surface of the first lens is a convex surface. Each of the second lens and the third lens has a positive refractive power or a negative refractive power. A distance TTL from the object-side surface of the first lens to the image plane on the optical axis and the total effective focal length f satisfy $0.7<TTL/f<1.1$.

20 Claims, 12 Drawing Sheets

(56) References Cited

U.S. PATENT DOCUMENTS

| | | | | |
|---|---|---|---|---|
| 2014/0184875 A1* | 7/2014 | Ahn | .................... | G02B 13/0035 |
| | | | | 348/335 |
| 2016/0227082 A1* | 8/2016 | Hsueh | ................ | G02B 13/0035 |
| 2016/0299316 A1* | 10/2016 | Shih | ........................ | G02B 7/028 |
| 2017/0192204 A1* | 7/2017 | Lee | .................... | G02B 13/0035 |
| 2018/0164547 A1* | 6/2018 | Fang | .................. | G02B 13/0045 |

FOREIGN PATENT DOCUMENTS

| | | |
|---|---|---|
| CN | 206039012 | 3/2017 |
| WO | 2016/003211 A1 | 1/2016 |

\* cited by examiner

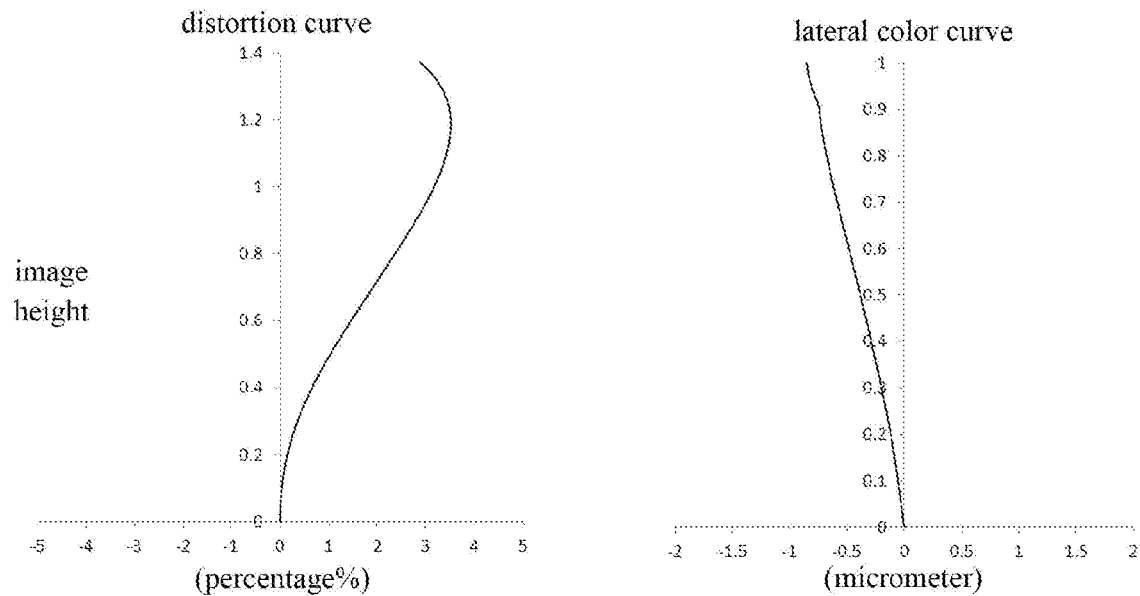
Fig. 2C
Fig. 2D
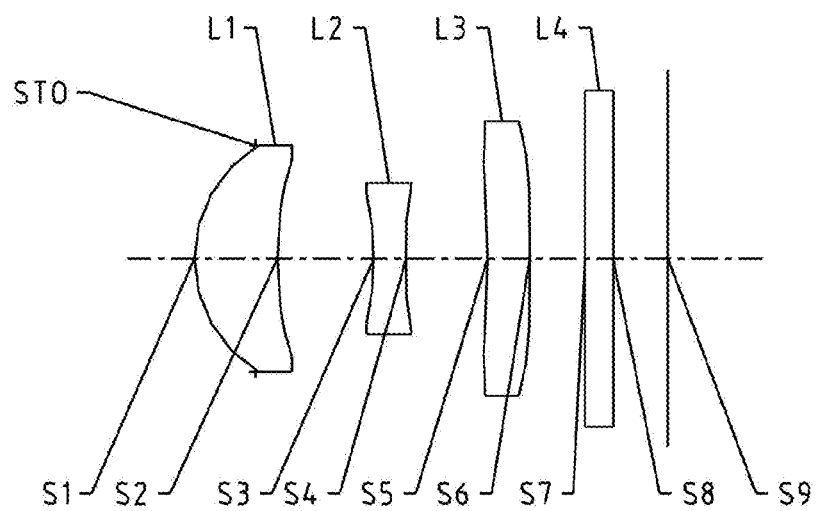
Fig. 3

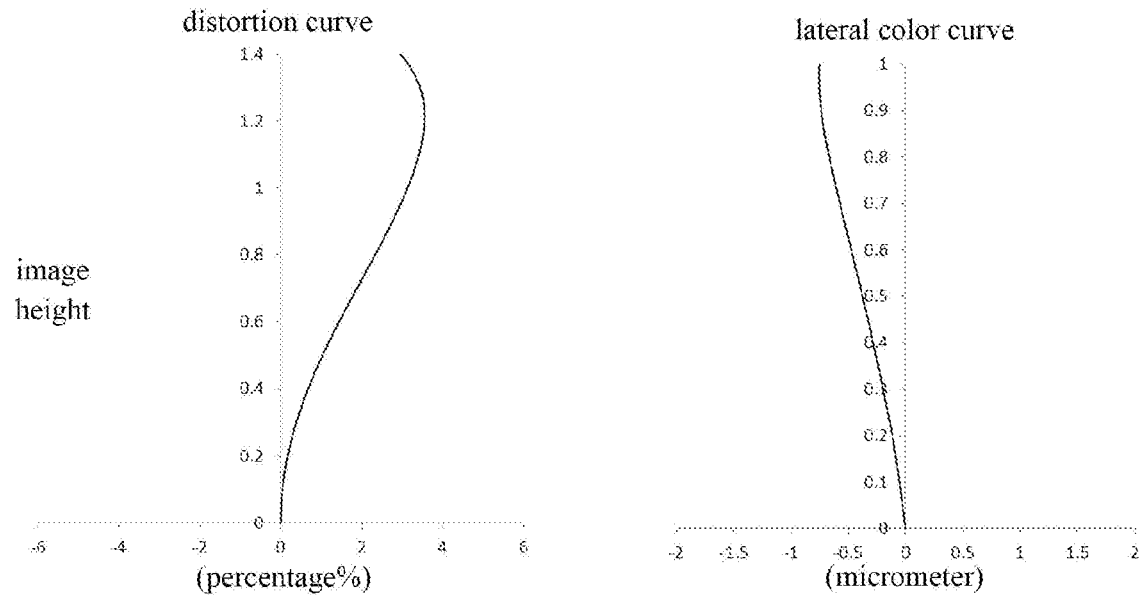
Fig. 6C
Fig. 6D
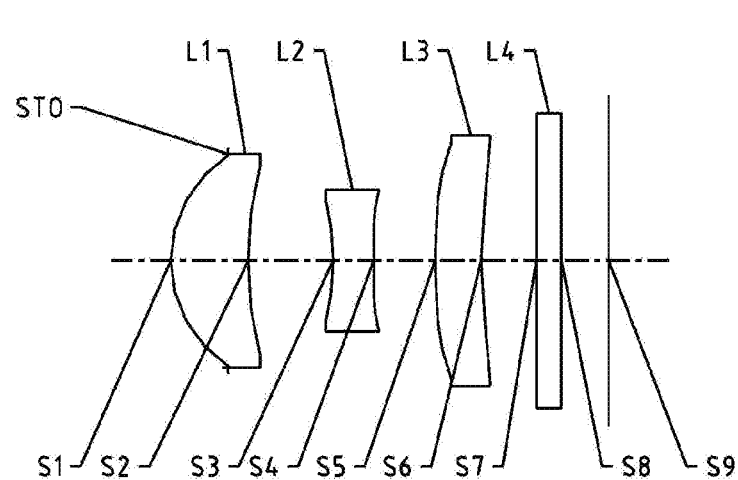
Fig. 7

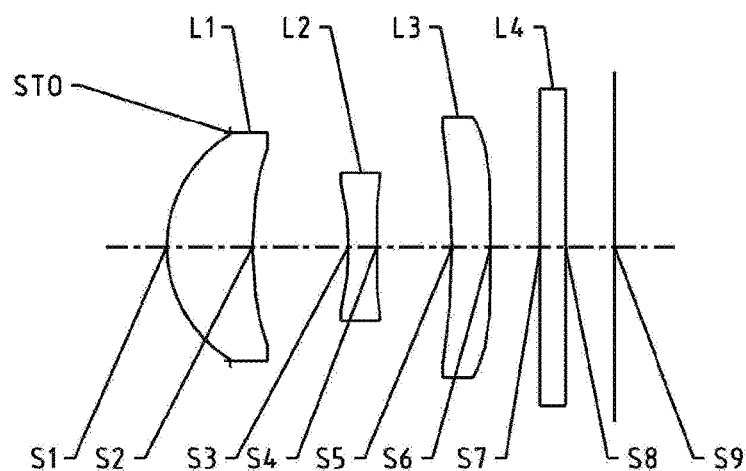
Fig. 9
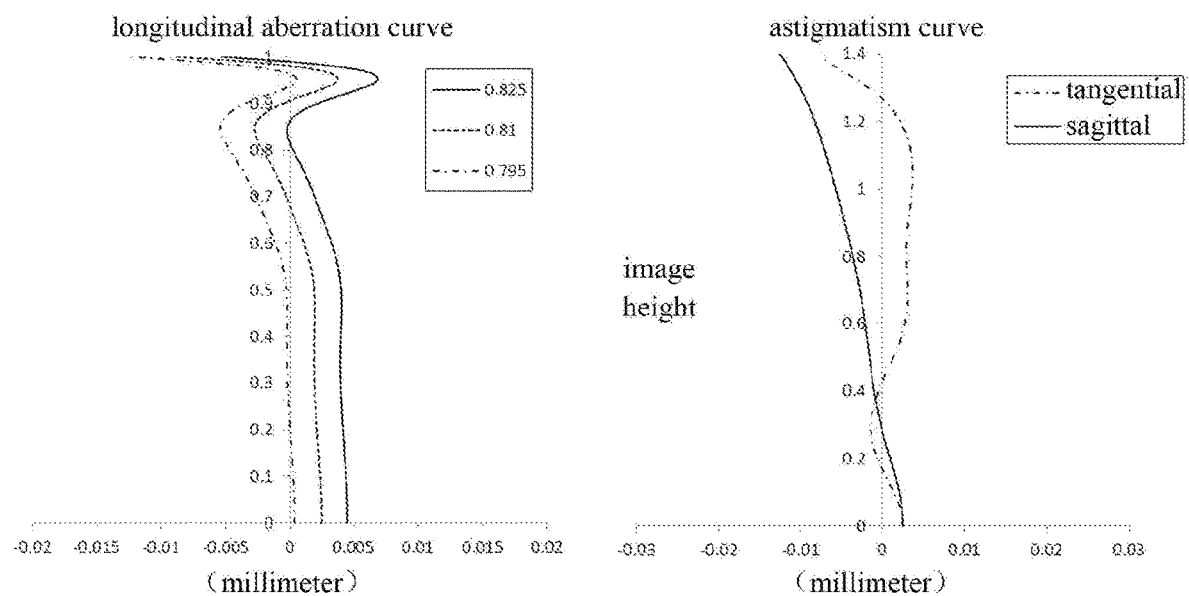
Fig. 10A
Fig. 10B

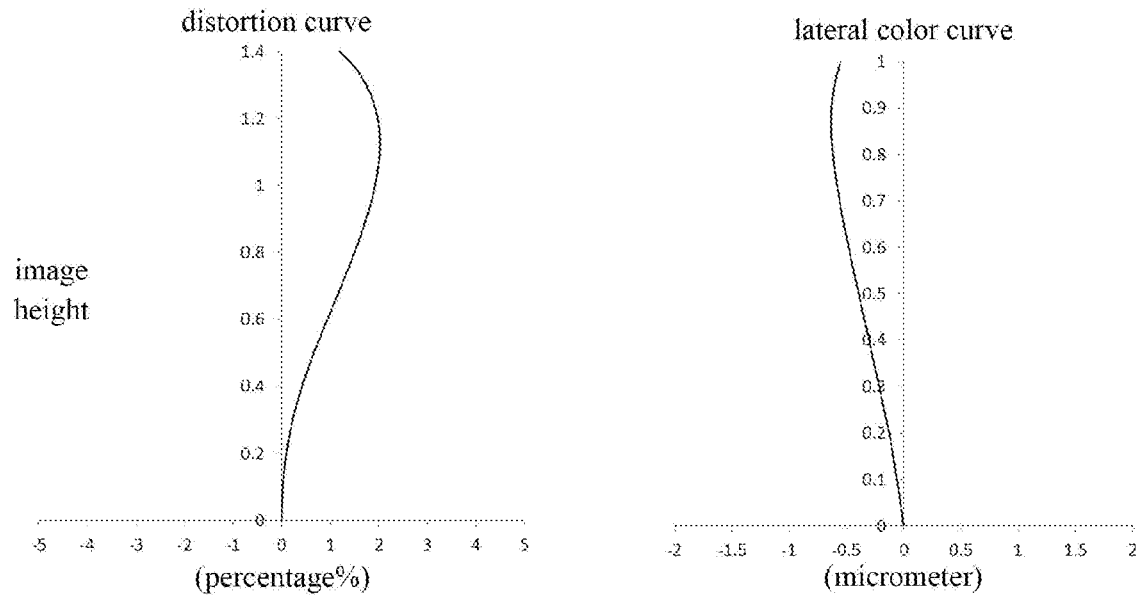
Fig. 10C
Fig. 10D
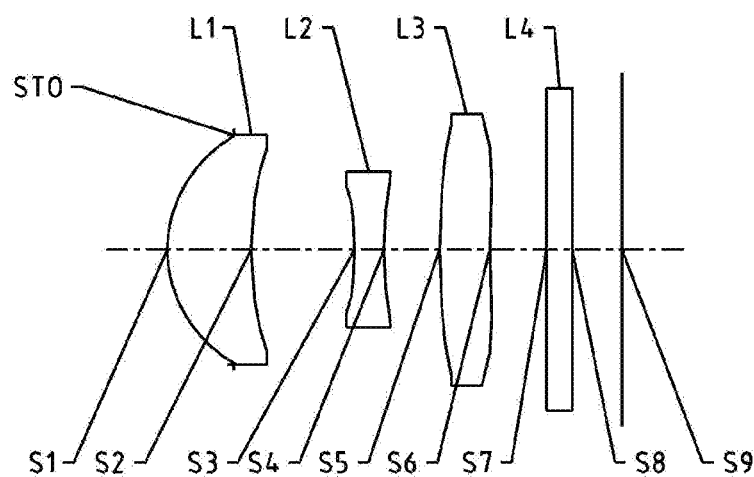
Fig. 11

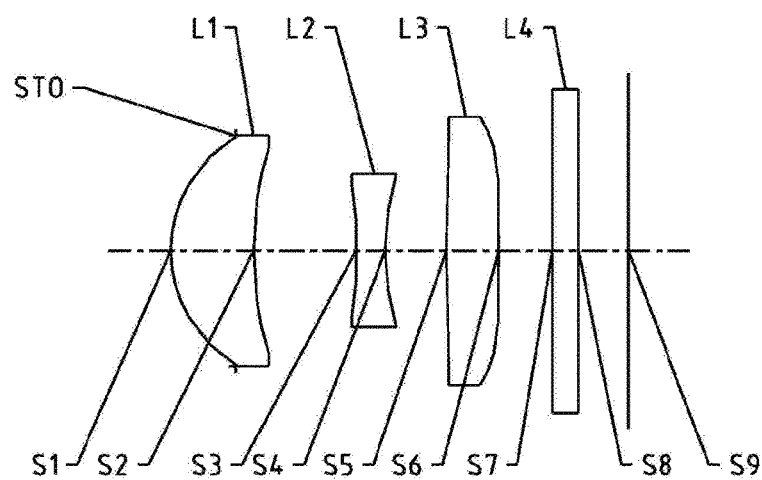
Fig. 13
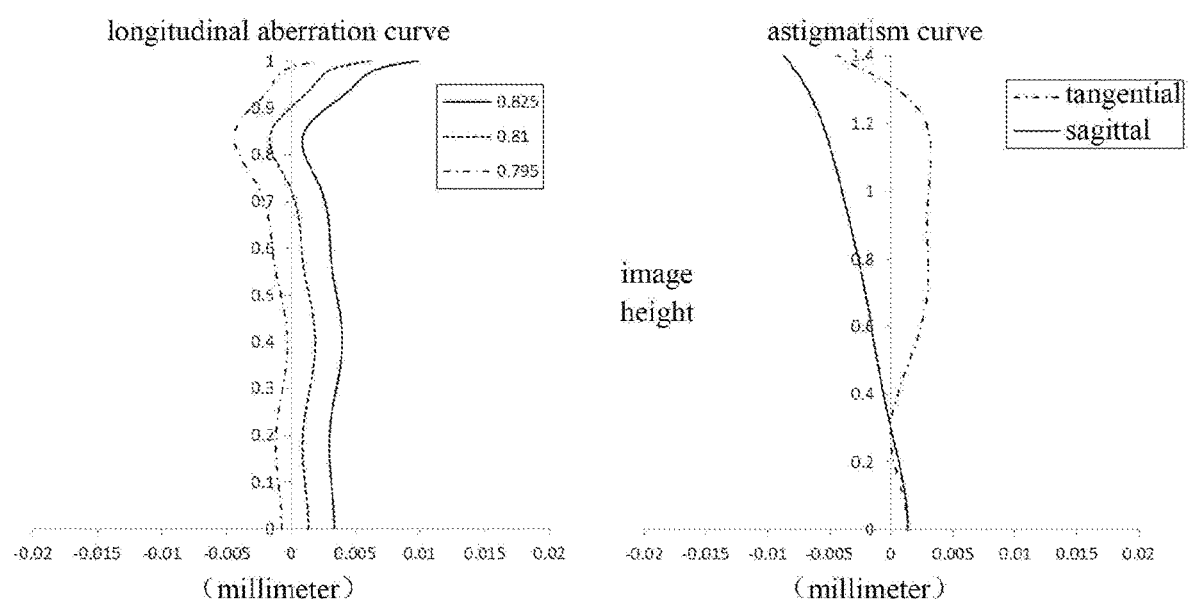
Fig. 14A
Fig. 14B

IRIS LENS ASSEMBLY

RELATED APPLICATIONS

The present application is a National Phase of International Application Number PCT/CN2017/107846, filed Oct. 26, 2017, and claims the priority of China Application No. 201710386419.9, filed May 26, 2017; and China Application No. 201720600534.7, filed May 26, 2017.

TECHNICAL FIELD

The present invention relates to an iris lens assembly, specifically to an iris lens assembly including three lenses.

BACKGROUND

In recent years, as the science and technology develops, portable electronic products are gradually emerging and portable electronic products with camera function are increasingly liked by people. Therefore, the market demand for camera lens assembly applicable to the portable electronic products is gradually increasing. Currently, the commonly used photosensitive elements in a camera lens assembly are CCD (Charge-Coupled Device) or CMOS (Complementary Metal-Oxide Semiconductor). As the semiconductor processing technology improves, the optical systems tend to have higher pixels, and pixel sizes on the chips become smaller and smaller. Accordingly, higher requirements on the high image quality and the miniaturization of the lens assembly used in combination have been brought forward.

In the biometric field in particular, as the biometric technology develops, requirements on iris lens assembly also become higher and higher, to correspond with the application in different products. The iris lens assembly applied in this technology not only needs to ensure a compact structure, but also needs to have higher brightness and resolution, to improve the recognition accuracy of the lens assembly.

Therefore, there is a need to provide an iris lens assembly having a compact structure, a high image quality and high recognition accuracy.

SUMMARY

The technical solutions provided in the present disclosure solve at least parts of the above-mentioned technical problems.

According to an aspect of the present disclosure, an iris lens assembly having a total effective focal length f and including sequentially a first lens, a second lens and a third lens from an object side to an image plane along an optical axis, is provided. The first lens has a positive refractive power, and an object-side surface of the first lens may be a convex surface. Each of the second lens and the third lens has a positive refractive power or a negative refractive power. Wherein, a distance TTL from the object-side surface of the first lens to the image plane on the optical axis and the total effective focal length f may satisfy 0.7<TTL/f<1.1.

According to another aspect of the present disclosure, an iris lens assembly including sequentially a first lens, a second lens and a third lens from an object side to an image plane along an optical axis, is provided. The first lens has a positive refractive power, and an object-side surface of the first lens may be a convex surface. Each of the second lens and the third lens has a positive refractive power or a negative refractive power. Wherein, a center thickness CT1 of the first lens on the optical axis and a center thickness CT2 of the second lens on the optical axis may satisfy 1.7<CT1/CT2<3.

According to another aspect of the present disclosure, an iris lens assembly including sequentially a first lens, a second lens and a third lens from an object side to an image plane along an optical axis, is provided. The first lens has a positive refractive power, and an object-side surface of the first lens may be a convex surface. Each of the second lens and the third lens has a positive refractive power or a negative refractive power. Wherein, a distance SAG32 from an intersection point of an image-side surface of the third lens and the optical axis to an effective radius vertex of the image-side surface of the third lens on the optical axis, and a center thickness CT3 of the third lens on the optical axis may satisfy 0.1<|SAG32/CT3|<0.8.

In an implementation, the iris lens assembly may further include an aperture diaphragm arranged between the object side and the first lens. A distance SL from the aperture diaphragm to the image plane on the optical axis, and the distance TTL from the object-side surface of the first lens to the image plane on the optical axis may satisfy 0.70<SL/TTL<1.25.

In an implementation, the center thickness CT1 of the first lens on the optical axis, the center thickness CT2 of the second lens on the optical axis and the center thickness CT3 of the third lens on the optical axis may satisfy 0.8<CT1/(CT2+CT3)<1.3.

In an implementation, the distance TTL from the object-side surface of the first lens to the image plane on the optical axis, and half of a diagonal length ImgH of an effective pixel area of an electronic photosensitive element on the image plane may satisfy TTL/ImgH ≤ 2.65.

In an implementation, the distance TTL from the object-side surface of the first lens to the image plane on the optical axis, and the total effective focal length f may satisfy 0.7<TTL/f<1.1.

In an implementation, a sum of a center thickness ΣCT of the first lens to the third lens on the optical axis, and the distance TTL from the object-side surface of the first lens to the image plane on the optical axis may satisfy ΣCT/TTL<0.4.

In an implementation, a distance SAG32 from an intersection point of an image-side surface of the third lens and the optical axis to an effective radius vertex of the image-side surface of the third lens on the optical axis, and a center thickness CT3 of the third lens on the optical axis may satisfy 0.1<|SAG32/CT3|<0.8.

In an implementation, an image-side surface of the first lens may be a concave surface, and a radius of curvature R2 of the image-side surface of the first lens and an effective focal length f1 of the first lens may satisfy 1.2<R2/f1<1.7.

In an implementation, the second lens may have a negative refractive power, and an effective focal length f1 of the first lens and an effective focal length f2 of the second lens may satisfy −0.9<f1/f2<−0.2.

In an implementation, an effective radius DT11 of an object-side surface of the first lens and an effective radius DT22 of an image-side surface of the second lens may satisfy 1.2<DT11/DT22<1.8.

In an implementation, the iris lens assembly further includes an infrared (IR) optical filter arranged between the third lens and the image plane, wherein a band-pass wave band of the infrared (IR) optical filter ranges from 750 nm to 900 nm. More specifically, the band-pass wave band of the infrared (IR) optical filter may range from 790 nm to 830 nm.

In the present disclosure, a plurality of (for example, three) lenses are used, and the iris lens assembly may have at least one of the following advantages by properly arranging the refractive power, surface type of each lens of the iris lens assembly: a compact structure, miniaturization, high brightness, high recognition accuracy, a high image quality, etc.

BRIEF DESCRIPTION OF THE DRAWINGS

By describing non-limiting implementations below in detail with reference to the accompanying drawings, other features, objectives and advantages of the present invention will be more apparent. In the accompanying drawings:

FIGS. 2A-2D illustrate a longitudinal aberration curve, an astigmatism curve, a distortion curve and a lateral color curve of the iris lens assembly according to Embodiment 1, respectively;

FIG. 3 is a schematic structural view illustrating an iris lens assembly according to Embodiment 2 of the present disclosure;

FIGS. 6A-6D illustrate a longitudinal aberration curve, an astigmatism curve, a distortion curve and a lateral color curve of the iris lens assembly according to Embodiment 3, respectively;

FIG. 7 is a schematic structural view illustrating an iris lens assembly according to Embodiment 4 of the present disclosure;

FIG. 9 is a schematic structural view illustrating an iris lens assembly according to Embodiment 5 of the present disclosure;

FIGS. 10A-10D illustrate a longitudinal aberration curve, an astigmatism curve, a distortion curve and a lateral color curve of the iris lens assembly according to Embodiment 5, respectively;

FIG. 11 is a schematic structural view illustrating an iris lens assembly according to Embodiment 6 of the present disclosure;

FIG. 13 is a schematic structural view illustrating an iris lens assembly according to Embodiment 7 of the present disclosure;

FIGS. 14A-14D illustrate a longitudinal aberration curve, an astigmatism curve, a distortion curve and a lateral color curve of the iris lens assembly according to Embodiment 7, respectively;

DETAILED DESCRIPTION OF EMBODIMENTS

Figure 1:
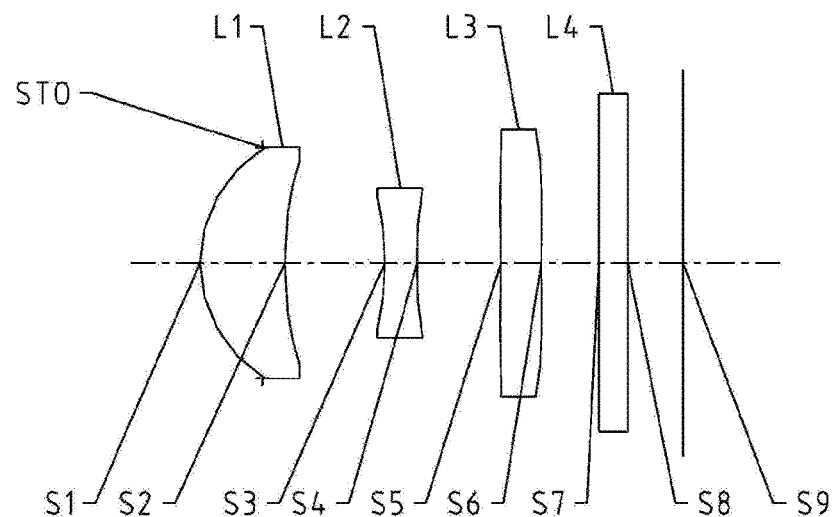
FIG. 1 is a schematic structural view illustrating an iris lens assembly according to Embodiment 1 of the present disclosure.

Various aspects of the present disclosure will be described in more detail with reference to the accompanying drawings, so as to better understand the present disclosure. It should be appreciated that the detailed description is merely an explanation for the exemplary embodiments of the present disclosure, rather than a limitation to the scope of the present disclosure in any way. The same reference numerals designate the same elements throughout this specification. The statement "and/or" includes any and all combinations of one or more of the associated listed items.

It should be noted that, in the Specification, statements, such as "first," "second" and "third" are merely used to distinguish one characteristic from another characteristic, rather than represent any limitations to the characteristics. Thus, a first lens discussed below could be referred to as a second lens or a third lens without departing from the teachings of the present disclosure.

In the accompanying drawings, for the convenience of description, thicknesses, dimensions and shapes of lenses have been slightly exaggerated. Specifically, spherical or aspheric shapes shown in the accompanying drawings are illustrated by examples. That is, spherical or aspheric shapes are not limited to the spherical or aspheric shapes shown in the accompanying drawings. The accompanying drawings are merely examples, not strictly drawn to scale.

In addition, a paraxial area indicates an area near an optical axis. In the present disclosure, a surface closest to an object in each lens is referred to as an object-side surface, and a surface closest to an image plane in each lens is referred to as an image-side surface.

It should be further understood that the terms "comprising," "including," "having" and variants thereof, when used in this specification, specify the presence of stated characteristics, entireties, steps, operations, elements and/or components, but do not exclude the presence or addition of one or more other characteristics, entireties, steps, operations, elements, components and/or combinations thereof. In addition, expressions, such as "at least one of," when preceding a list of elements, modify the entire list of elements rather than an individual element in the list. Further, the use of "may," when describing embodiments of the present disclosure, relates to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that, the embodiments in the present disclosure and the features in the embodiments may be combined with each other on a non-conflict basis. The present disclosure will be described below in detail with reference to the accompanying drawings and in combination with the embodiments.

Characteristics, principles and other aspects of the present disclosure will be described below in detail.

An iris lens assembly according to exemplary implementations of the present disclosure includes, for example, three lenses (i.e., a first lens, a second lens and a third lens). The three lenses are arranged in sequence from an object side to an image plane along an optical axis.

In an exemplary implementation, the first lens may have a positive refractive power, and an object-side surface of the first lens may be a convex surface. The second lens has a positive refractive power or a negative refractive power, and the third lens has a positive refractive power or a negative refractive power.

In some implementations, an aperture diaphragm STO for limiting light beams may be arranged between the object side and the first lens to improve the image quality of the iris lens assembly. A distance SL from the aperture diaphragm STO to the image plane of the iris lens assembly on the optical axis, and a distance TTL from the object-side surface of the first lens to the image plane of the iris lens assembly on the optical axis may satisfy 0.70<SL/TTL<1.25. More specifically, SL and TTL may further satisfy 0.85 ≤ SL/TTL ≤ 1.05, to achieve effects of high resolution, miniaturization and a small front-end opening.

Alternatively, the iris lens assembly may further include an optical filter arranged between the third lens and the image plane. The optical filter may be an infrared (IR) optical filter, and the infrared (IR) optical filter may be used to filter noises from visible light to achieve a high performance recognition effect of the lens assembly. A band-pass wave band of the optical filter may range from about 750 nm to about 900 nm, and more specifically, the band-pass wave band may range from about 790 nm to about 830 nm, so as to reduce interferences of white light and improve the recognition effect of the iris lens assembly.

The distance TTL from the object-side surface of the first lens to the image plane of the iris lens assembly on the optical axis, and half of a diagonal length ImgH of an effective pixel area on the image plane of the iris lens assembly may satisfy TTL/ImgH ≤ 2.65. More specifically, TTL and ImgH may further satisfy 2.50 ≤ TTL/ImgH ≤ 2.64, to make the structure of the iris lens assembly compact to achieve the effect of the miniaturization.

The distance TTL from the object-side surface of the first lens to the image plane of the iris lens assembly on the optical axis, and a total effective focal length of the iris lens assembly f may satisfy 0.7<TTL/f<1.1. More specifically, TTL and f may further satisfy 0.88 ≤ TTL/f ≤ 0.94, to ensure a larger focal length while the miniaturization is realized.

In application, the center thicknesses of each lens may be properly arranged to reduce aberrations and improve the resolution and the recognition accuracy of the lens assembly. For example, a center thickness CT1 of the first lens on the optical axis and a center thickness CT2 of the second lens on the optical axis may satisfy 1.7<CT1/CT2<3. More specifically, CT1 and CT2 may further satisfy 1.91 ≤ CT1/CT2 ≤ 2.95. As another example, the center thickness CT1 of the first lens on the optical axis, the center thickness CT2 of the second lens on the optical axis and a center thickness CT3 of the third lens on the optical axis may satisfy 0.8<CT1/(CT2+CT3)<1.3. More specifically, CT1, CT2 and CT3 may further satisfy 0.89 ≤ CT1/(CT2+CT3) ≤ 1.26.

In addition, a sum of a center thickness ΣCT of the first lens to the third lens on the optical axis, and the distance TTL from the object-side surface of the first lens to the image plane of the iris lens assembly on the optical axis may satisfy ΣCT/TTL<0.4. More specifically, ΣCT and TTL may further satisfy 0.33 ≤ ΣCT/TTL ≤ 0.37. The sizes of the lenses are properly distributed, which is conducive to the assemblage and the production and processing of the lens assembly.

In some implementations, a distance SAG32 from an intersection point of an image-side surface of the third lens and the optical axis to an effective radius vertex of the image-side surface of the third lens on the optical axis, and the center thickness CT3 of the third lens on the optical axis may satisfy 0.1<|SAG32/CT3|<0.8. More specifically, SAG32 and CT3 may further satisfy 0.14 ≤ |SAG32/CT3| ≤ 0.72. The shape and refractive power of the third lens are properly distributed, which is helpful to improve the relative illumination of the lens assembly and control an incident angle of a chief ray incoming an electronic photosensitive element.

In some implementations, an image-side surface of the first lens may be a concave surface. A radius of curvature R2 of the image-side surface of the first lens, and an effective focal length f1 of the first lens may satisfy 1.2<R2/f1<1.7. More specifically, R2 and f1 may further satisfy 1.22 ≤ R2/f1 ≤ 1.58. The shape and refractive power of the first lens are properly distributed, which is helpful to reduce the aberrations of the lens assembly and improve the resolution and the recognition accuracy.

In some implementations, the second lens may have a negative refractive power. The effective focal length f1 of the first lens, and an effective focal length f2 of the second lens may satisfy −0.9<f1/f2<−0.2. More specifically, f1 and f2 may further satisfy −0.89 ≤ f1/f2 ≤ −0.56. By properly distributing the refractive powers of the lenses, the aberrations can be reduced, and the resolution and the recognition accuracy can be improved.

In some implementations, an effective radius DT11 of the object-side surface of the first lens, and an effective radius DT22 of an image-side surface of the second lens may satisfy 1.2<DT11/DT22<1.8. More specifically, DT11 and DT22 may further satisfy 1.47 ≤ DT11/DT22 ≤ 1.56.

The iris lens assembly according to the above implementations of the present disclosure may include multiple lenses. By properly distributing the refractive power, the surface types and the center thickness of each lens, axial spacing distances between lenses, and so on, the structure of the lens assembly can be effectively compacted, and the miniaturization of the lens assembly can be effectively ensured, so that the iris lens assembly is more conducive to the production and processing and can be applied to portable electronic products. In the implementations of the present disclosure, at least one of mirror surfaces of respective lenses is an aspheric mirror surface. An aspheric lens is characterized in that its curvature continuously changes from the lens center to the periphery. In contrast to a spherical lens having a constant curvature from the lens center to the periphery, the aspheric lens has a better radius-of-curvature characteristic, and has advantages of reducing the distortion aberration and the astigmatism aberration. The use of the aspheric lens can eliminate as much as possible the aberrations that occur during the imaging, thereby improving the image quality.

However, it should be understood by those skilled in the art that, in a situation without departing from the technical solution sought to be protected by the present disclosure, the number of lenses forming the lens assembly may be changed, to obtain various results and advantages described in the Specification of the present disclosure. For instance, in the descriptions of the implementations, an iris lens assembly having three lenses is described as an example, but the iris lens assembly is not limited to include three lenses. If necessary, the iris lens assembly may also include other numbers of lenses.

Specific embodiments applicable to the iris lens assembly of the above implementations will be further described below with reference to the accompanying drawings.

Embodiment 1

An iris lens assembly according to Embodiment 1 of the present disclosure is described below with reference to FIGS. 1-2D. FIG. 1 is a schematic structural view illustrating the iris lens assembly according to Embodiment 1 of the present disclosure.

As shown in FIG. 1, the iris lens assembly includes, along an optical axis, three lenses L1-L3 arranged in sequence from an object side to an image plane. A first lens L1 has an object-side surface S1 and an image-side surface S2, a second lens L2 has an object-side surface S3 and an image-side surface S4, and a third lens L3 has an object-side surface S5 and an image-side surface S6. Alternatively, the iris lens assembly may further include an optical filter L4 having an object-side surface S7 and an image-side surface S8. The optical filter L4 is an infrared (IR) optical filter. A band-pass wave band of the optical filter may range from about 750 nm to about 900 nm, and the band-pass wave band of the optical filter may further range from about 790 nm to about 830 nm. In the iris lens assembly of this embodiment, an aperture diaphragm STO for limiting light beams may also be arranged between the object side and the first lens L1, to improve the image quality of the iris lens assembly. Light from an object sequentially passes through the surfaces S1 to S8 and finally forms an image on the image plane S9.

Table 1 shows the surface type, the radius of curvature, the thickness, the material and the conic coefficient of each lens of the iris lens assembly in Embodiment 1. The radius of curvature and the thickness are shown in millimeters (mm).

Referring to Table 1, the distance SL from the diaphragm STO to the image plane S9 of the iris lens assembly on the optical axis, and the distance TTL from the object-side surface S1 of the first lens L1 to the image plane S9 of the iris lens assembly on the optical axis satisfy SL/TTL=0.87. The center thickness CT1 of the first lens L1 on the optical axis, the center thickness CT2 of the second lens L2 on the optical axis and the center thickness CT3 of the third lens L3 on the optical axis satisfy CT1/(CT2+CT3)=1.15. The center thickness CT1 of the first lens L1 on the optical axis, and the center thickness CT2 of the second lens L2 on the optical axis satisfy CT1/CT2=2.55. The sum of the center thickness ΣCT of the first lens L1 to the third lens L3 on the optical axis and the distance TTL from the object-side surface S1 of the first lens L1 to the image plane S9 of the iris lens assembly on the optical axis satisfy ΣCT/TTL=0.33.

In this embodiment, an iris lens assembly having three lenses is used as an example. By properly distributing the focal length and the surface form of each lens, the total length of the lens assembly is effectively reduced, the compactness of the structure is effectively ensured, and the recognition accuracy is effectively improved. Meanwhile, various aberrations are corrected, and the resolution and image quality of the iris lens assembly are effectively improved. A surface type x of each aspheric surface is defined by the following formula:

$$x = \frac{ch^2}{1 + \sqrt{1 - (k+1)c^2h^2}} + \Sigma A_i h^i. \quad (1)$$

Here, x is the sag—the axis-component of the displacement of the surface from the aspheric vertex, when the surface is at height h from the optical axis; c is a paraxial curvature of the aspheric surface, and c=1/R (i.e., the paraxial curvature c is the reciprocal of the curvature radius R in Table 1); k is a conic coefficient (given in the above Table 1); and Ai is a correction coefficient of the i-th order of the aspheric surface. Table 2 below shows high-order coefficients $A_4$, $A_6$, $A_8$, $A_{10}$, $A_{12}$, $A_{14}$, $A_{16}$, $A_{18}$ and $A_{20}$ that can be applied to each aspheric mirror surface S1-S6 in Embodiment 1.

TABLE 1

| surface number | surface type | radius of curvature | thickness | material refractive index | abbe number | conic coefficient |
|---|---|---|---|---|---|---|
| OBJ | spherical | infinite | 500.0000 | | | |
| STO | spherical | infinite | −0.4501 | | | |
| S1 | aspheric | 0.9810 | 0.6128 | 1.53 | 55.8 | −0.1718 |
| S2 | aspheric | 3.1953 | 0.7231 | | | 10.6865 |
| S3 | aspheric | −2.3592 | 0.2400 | 1.62 | 23.5 | −99.0000 |
| S4 | aspheric | 41.5979 | 0.6052 | | | 50.0000 |
| S5 | aspheric | −9.8320 | 0.2932 | 1.53 | 55.8 | −99.0000 |
| S6 | aspheric | 17.6092 | 0.4153 | | | 50.0000 |
| S7 | spherical | infinite | 0.2100 | 1.52 | 64.2 | |
| S8 | spherical | infinite | 0.4000 | | | |
| S9 | spherical | infinite | | | | |

TABLE 2

| surface number | A4 | A6 | A8 | A10 | A12 |
|---|---|---|---|---|---|
| S1 | 1.0254E−02 | 3.0138E−02 | −3.1064E−02 | −1.6727E−01 | 2.2603E+00 |
| S2 | 1.7691E−02 | −1.0452E−01 | 1.2123E+00 | −8.7076E+00 | 3 8492E+01 |
| S3 | −8.0842E−01 | 7.7994E+00 | −8.7707E+01 | 7.8480E+02 | −5.2582E+03 |
| S4 | 4.8225E−01 | 6.7030E−01 | −1.8222E+01 | 2.1924E+02 | −1.7178E+03 |
| S5 | 5.5793E−02 | −2.4684E−01 | 1.7817E+00 | −7.1271E+00 | 1.7385E+01 |
| S6 | −7.1242E−02 | 1.1030E−01 | −1.3744E+00 | 6.7488E+00 | −1.9091E+01 |

| surface number | A14 | A16 | A18 | A20 |
|---|---|---|---|---|
| S1 | −8.4740E+00 | 1.6178E+01 | −1.5686E+01 | 6.2594E+00 |
| S2 | −1.0662E+02 | 1.8009E+02 | −1.6931E+02 | 6.8147E+01 |
| S3 | 2.3632E+04 | −6.5712E+04 | 9.9793E+04 | −6.1409E+04 |
| S4 | 8.5381E+03 | −2.5903E+04 | 4.3625E+04 | −3.1188E+04 |
| S5 | −2.4781E+01 | 1.9027E+01 | −6.2447E+00 | 1.8396E−01 |
| S6 | 3.2878E+01 | −3.3786E+01 | 1.8989E+01 | 4.4811E+00 |

Table 3 shows the total effective focal length f of the iris lens assembly of Embodiment 1, the effective focal lengths f1-f3 of the lenses, the distance TTL from the object-side surface S1 of the first lens L1 to the image plane S9 on the optical axis, and half of the diagonal length ImgH of the effective pixel area on the image plane S9.

TABLE 3

| | parameter | | | | |
|---|---|---|---|---|---|
| | f(mm) | f1(mm) | f2(mm) | f3(mm) | TTL(mm) | ImgH(mm) |
| value | 3.98 | 2.45 | −3.58 | −11.90 | 3.50 | 1.40 |

According to Table 3, the distance TTL from the object-side surface S1 of the first lens L1 to the image plane S9 on the optical axis, and half of the diagonal length ImgH of the effective pixel area on the image plane S9 satisfy TTL/ImgH=2.50. The distance TTL from the object-side surface S1 of the first lens L1 to the image plane S9 on the optical axis, and the total effective focal length f of the iris lens assembly satisfy TTL/f=0.88. The effective focal length f1 of the first lens L1 and the effective focal length f2 of the second lens L2 satisfy f1/f2=3.51. In view of Table 1 and Table 3, it can be obtained that the radius of curvature R2 of the image-side surface S2 of the first lens L1 and the effective focal length f1 of the first lens L1 satisfy R2/f1=1.31.

In addition, the distance SAG32 from the intersection point of the image-side surface S6 of the third lens L3 and the optical axis to the effective radius vertex of the image-side surface S6 of the third lens L3 on the optical axis, and the center thickness CT3 of the third lens L3 on the optical axis satisfy |SAG32/CT3|=0.14. The effective radius DT11 of the object-side surface S1 of the first lens L1 and the effective radius DT22 of the image-side surface S4 of the second lens L2 may satisfy DT11/DT22=1.53.

Figures 2A, 2B:
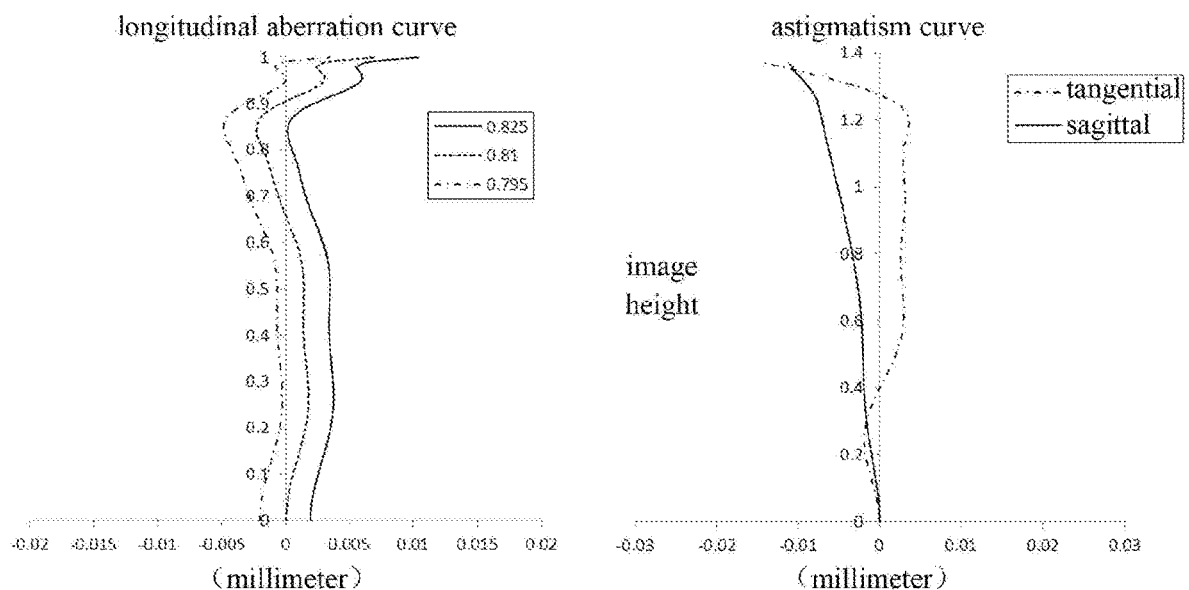

FIG. 2A illustrates a longitudinal aberration curve of the iris lens assembly according to Embodiment 1, representing deviations of focal points of light of different wavelengths converged after passing through the iris lens assembly. FIG. 2B illustrates an astigmatism curve of the iris lens assembly according to Embodiment 1, representing a curvature of a tangential plane and a curvature of a sagittal plane. FIG. 2C illustrates a distortion curve of the iris lens assembly according to Embodiment 1, representing amounts of distortion at different viewing angles. FIG. 2D illustrates a lateral color curve of the iris lens assembly according to Embodiment 1, representing deviations of different image heights on an image plane after light passes through the iris lens assembly. It can be seen from FIGS. 2A-2D that the iris lens assembly according to Embodiment 1 can achieve a good image quality.

Embodiment 2

An iris lens assembly according to Embodiment 2 of the present disclosure is described below with reference to FIGS. 3-4D. In this embodiment and the following embodiments, for the purpose of brevity, the description of parts similar to those in Embodiment 1 will be omitted. FIG. 3 is a schematic structural view illustrating the iris lens assembly according to Embodiment 2 of the present disclosure.

As shown in FIG. 3, the iris lens assembly includes, along an optical axis, three lenses L1-L3 arranged in sequence from an object side to an image plane. A first lens L1 has an object-side surface S1 and an image-side surface S2, a second lens L2 has an object-side surface S3 and an image-side surface S4, and a third lens L3 has an object-side surface S5 and an image-side surface S6. Alternatively, the iris lens assembly may further include an optical filter L4 having an object-side surface S7 and an image-side surface S8. The optical filter L4 is an infrared (IR) optical filter. A band-pass wave band of the optical filter may range from about 750 nm to about 900 nm, and the band-pass wave band of the optical filter may further range from about 790 nm to about 830 nm. In the iris lens assembly of this embodiment, an aperture diaphragm STO for limiting light beams may also be arranged between the object side and the first lens L1, to improve the image quality of the iris lens assembly. Light from an object sequentially passes through the surfaces S1 to S8 and finally forms an image on the image plane S9.

Table 4 shows the surface type, the radius of curvature, the thickness, the material and the conic coefficient of each lens of the iris lens assembly in Embodiment 2. The radius of curvature and the thickness are shown in millimeters (mm). Table 5 shows high-order coefficients $A_4$, $A_6$, $A_8$, $A_{10}$, $A_{12}$, $A_{14}$, $A_{16}$, $A_{18}$ and $A_{20}$ that can be applied to each aspheric mirror surfaces S1-S6 in Embodiment 2. Table 6 shows the total effective focal length f of the iris lens assembly of Embodiment 2, the effective focal lengths f1-f3 of the lenses, the distance TTL from the object-side surface S1 of the first lens L1 to the image plane S9 on the optical axis, and half of the diagonal length ImgH of the effective pixel area on the image plane S9. A surface type of each aspheric surface may be defined by the formula (1) provided in Embodiment 1.

TABLE 4

| surface number | surface form | radius of curvature | thickness | material refractive index | material abbe number | conic coefficient |
|---|---|---|---|---|---|---|
| OBJ | spherical | infinite | 500.0000 | | | |
| STO | spherical | infinite | −0.4527 | | | |
| S1 | aspheric | 0.9750 | 0.6147 | 1.53 | 55.8 | −0.1722 |
| S2 | aspheric | 3.1253 | 0.7123 | | | 10.4413 |
| S3 | aspheric | −2.3178 | 0.2400 | 1.62 | 23.5 | −94.1421 |
| S4 | aspheric | infinite | 0.6034 | | | −99.0000 |
| S5 | aspheric | −5.6195 | 0.3126 | 1.53 | 55.8 | −34.0553 |
| S6 | aspheric | infinite | 0.4075 | | | −99.0000 |
| S7 | spherical | infinite | 0.2100 | 1.52 | 64.2 | |
| S8 | spherical | infinite | 0.4043 | | | |
| S9 | spherical | infinite | | | | |

TABLE 5

| surface number | A4 | A6 | A8 | A10 | A12 |
|---|---|---|---|---|---|
| S1 | 1.0130E−02 | 3.1592E−02 | −5.9786E−02 | 5.8256E−02 | 1.3141E+00 |
| S2 | 1.4527E−02 | −8.1497E−02 | 7.9280E−01 | −5.0532E+00 | 1.9699E+01 |
| S3 | −8.2320E−01 | 7.6169E+00 | −8.2851E+01 | 7.2191E+02 | 4.7303E+03 |
| S4 | 4.6484E−01 | 6.8695E−01 | −1.6727E+01 | 1.9414E+02 | −1.4766E+03 |
| S5 | 3.7363E−02 | −1.6890E−01 | 1.5377E+00 | −7.3089E+00 | 2.1522E+01 |
| S6 | −5.2140E−02 | −1.5707E−01 | 7.3896E−01 | −2.5958E+00 | 5.6549E+00 |

| surface number | A14 | A16 | A18 | A20 |
|---|---|---|---|---|
| S1 | −6.1681E+00 | 1.2893E+01 | −1.3136E+01 | 5.4189E+00 |
| S2 | 4.8443E+01 | 7.3027E+01 | −6.1545E+01 | 2.2386E+01 |
| S3 | 2.0741E+04 | −5.5860E+04 | 8.0920E+04 | 4.5940E+04 |
| S4 | 7.1504E+03 | −2.1210E+04 | 3.5033E+04 | −2.4621E+04 |
| S5 | −3.8487E+01 | 4.0585E+01 | −2.3160E+01 | 5.5097E+00 |
| S6 | −7.3791E+00 | 5.5833E+00 | −2.2318E+00 | 3.6138E−01 |

TABLE 6

| | parameter | | | | | |
|---|---|---|---|---|---|---|
| | f(mm) | f1(mm) | f2(mm) | f3(mm) | TTL(mm) | ImgH(mm) |
| value | 3.97 | 2.44 | −3.73 | −10.64 | 3.50 | 1.40 |

Figure 4A:
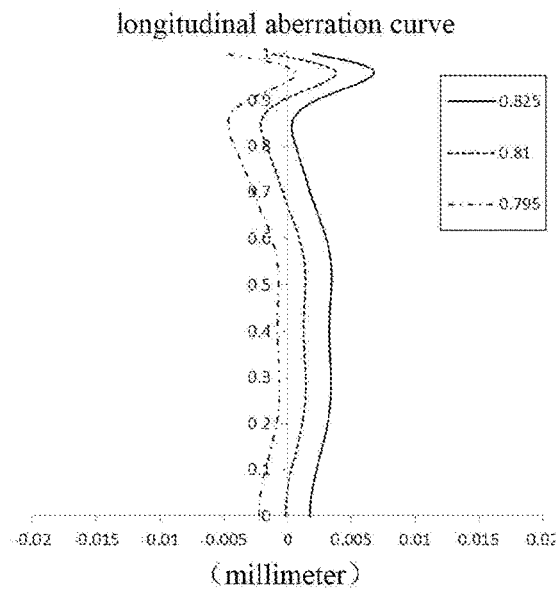
FIGS. 4A-4D illustrate a longitudinal aberration curve, an astigmatism curve, a distortion curve and a lateral color curve of the iris lens assembly according to Embodiment 2, respectively.
Figure 4B:
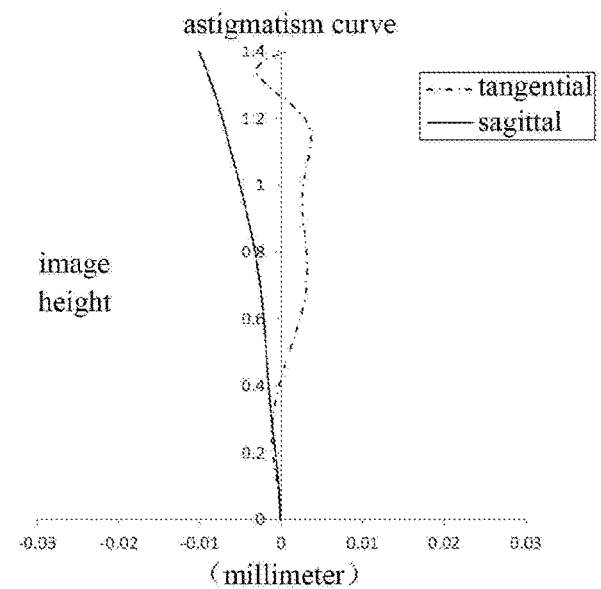
Figure 4C:
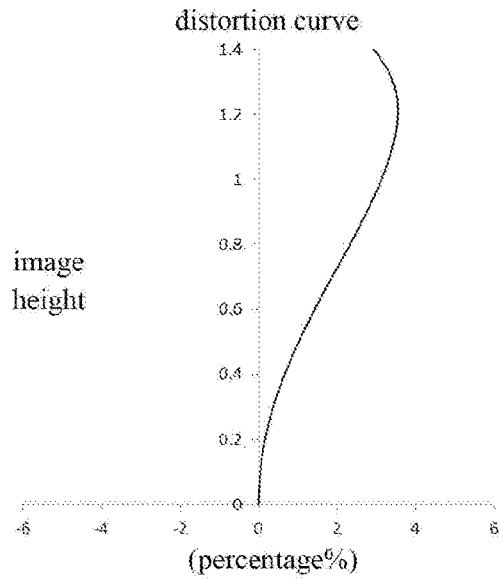
Figure 4D:
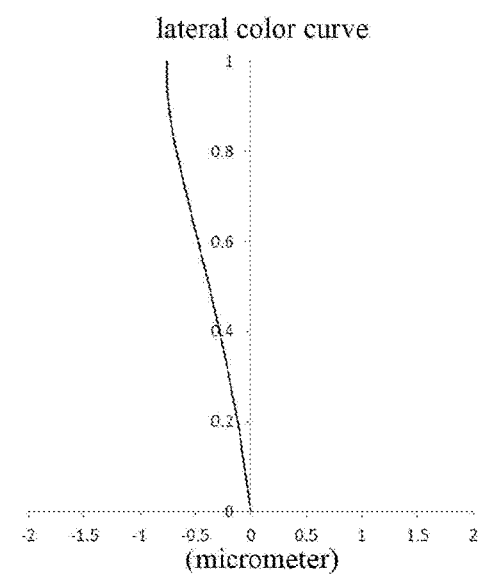

FIG. 4A illustrates a longitudinal aberration curve of the iris lens assembly according to Embodiment 2, representing deviations of focal points of light of different wavelengths converged after passing through the iris lens assembly. FIG. 4B illustrates an astigmatism curve of the iris lens assembly according to Embodiment 2, representing a curvature of a tangential plane and a curvature of a sagittal plane. FIG. 4C illustrates a distortion curve of the iris lens assembly according to Embodiment 2, representing amounts of distortion at different viewing angles. FIG. 4D illustrates a lateral color curve of the iris lens assembly according to Embodiment 2, representing deviations of different image heights on an image plane after light passes through the iris lens assembly. It can be seen from FIGS. 4A-4D that the iris lens assembly according to Embodiment 2 can achieve a good image quality.

Embodiment 3

Figure 5:
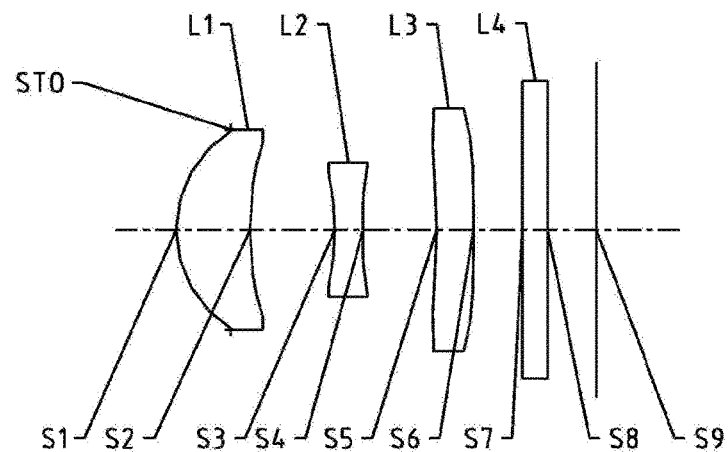
FIG. 5 is a schematic structural view illustrating an iris lens assembly according to Embodiment 3 of the present disclosure.

An iris lens assembly according to Embodiment 3 of the present disclosure is described below with reference to FIGS. 5-6D. FIG. 5 is a schematic structural view illustrating the iris lens assembly according to Embodiment 3 of the present disclosure.

As shown in FIG. 5, the iris lens assembly includes, along an optical axis, three lenses L1-L3 arranged in sequence from an object side to an image plane. A first lens L1 has an object-side surface S1 and an image-side surface S2, a second lens L2 has an object-side surface S3 and an image-side surface S4, and a third lens L3 has an object-side surface S5 and an image-side surface S6. Alternatively, the iris lens assembly may further include an optical filter L4 having an object-side surface S7 and an image-side surface S8. The optical filter L4 is an infrared (IR) optical filter. A band-pass wave band of the optical filter may range from about 750 nm to about 900 nm, and the band-pass wave band of the optical filter may further range from about 790 nm to about 830 nm. In the iris lens assembly of this embodiment, an aperture diaphragm STO for limiting light beams may also be arranged between the object side and the first lens L1, to improve the image quality of the iris lens assembly. Light from an object sequentially passes through the surfaces S1 to S8 and finally forms an image on the image plane S9.

Table 7 shows the surface type, the radius of curvature, the thickness, the material and the conic coefficient of each lens of the iris lens assembly in Embodiment 3. The radius of curvature and the thickness are shown in millimeters (mm). Table 8 shows high-order coefficients $A_4, A_6, A_8, A_{10}, A_{12}, A_{14}, A_{16}, A_{18}$ and $A_{20}$ that can be applied to each aspheric mirror surfaces S1-S6 in Embodiment 3. Table 9 shows the total effective focal length f of the iris lens assembly of Embodiment 3, the effective focal lengths f1-f3 of the lenses, the distance TTL from the object-side surface S1 of the first lens L1 to the image plane S9 on the optical axis, and half of the diagonal length ImgH of the effective pixel area on the image plane 9. A surface type of each aspheric surface may be defined by the formula (i) provided in Embodiment 1.

TABLE 7

| surface number | surface form | radius of curvature | thickness | material refractive index | abbe number | conic coefficient |
|---|---|---|---|---|---|---|
| OBJ | spherical | infinite | 500.0000 | | | |
| STO | spherical | infinite | −0.4539 | | | |
| S1 | aspheric | 0.9733 | 0.6158 | 1.53 | 55.8 | −0.1720 |
| S2 | aspheric | 3.1060 | 0.7060 | | | 10.3044 |
| S3 | aspheric | −2.2847 | 0.2400 | 1.62 | 23.5 | −92.7617 |
| S4 | aspheric | −101.0950 | 0.6129 | | | −38.6500 |
| S5 | aspheric | −5.2282 | 0.3100 | 1.53 | 55.8 | −30.9441 |
| S6 | aspheric | −100.5508 | 0.4059 | | | −99.0000 |
| S7 | spherical | infinite | 0.2100 | 1.52 | 64.2 | |
| S8 | spherical | infinite | 0.4044 | | | |
| S9 | spherical | infinite | | | | |

TABLE 8

| surface number | A4 | A6 | A8 | A10 | A12 |
|---|---|---|---|---|---|
| S1 | 1.0229E−02 | 3.2835E−02 | −7.8157E−02 | 2.0314E−01 | 6.7879E−01 |
| S2 | 1.4488E−02 | −7.8860E−02 | 7.5269E−01 | −4.7719E+00 | 1.8486E+01 |
| S3 | −8.4271E−01 | 7.9031E+00 | −8.5539E+01 | 7.3987E+02 | −1.8072E+03 |
| S4 | 4.7174E−01 | 6.1824E−01 | −1.5468E+01 | 1.8084E+02 | −1.3921E+03 |
| S5 | 4.3473E−02 | −2.0655E−01 | 1.7419E+00 | −8.1405E+00 | 2.3664E+01 |
| S6 | −4.4013E−02 | −1.6813E−01 | 7.4294E−01 | −2.5475E+00 | 5.4657E+00 |

| surface number | A14 | A16 | A18 | A20 |
|---|---|---|---|---|
| S1 | −4.5194E+00 | 1.0374E+01 | −1.1039E+01 | 4.6803E+00 |
| S2 | −1.5306E+01 | 6.8136E+01 | −5.7281E+01 | 2.0726E+01 |
| S3 | 2.0907E+04 | −5.5820E+04 | 7.9951E+04 | −4.4546E+04 |
| S4 | 6.8242E+03 | −2.0468E+04 | 3.4131E+04 | −2.4183E+04 |
| S5 | −1.1896E+01 | 4.3834E+01 | −2.4857E+01 | 5.8834E+00 |
| S6 | −7.0315E+00 | 5.2374E+00 | −2.0555E+00 | 3.2601E−01 |

TABLE 9

| | parameter | | | | | |
|---|---|---|---|---|---|---|
| | f(mm) | f1(mm) | f2(mm) | f3(mm) | TTL(mm) | ImgH(mm) |
| value | 3.97 | 2.44 | −3.76 | −10.45 | 3.50 | 1.40 |

Figures 6A, 6B:
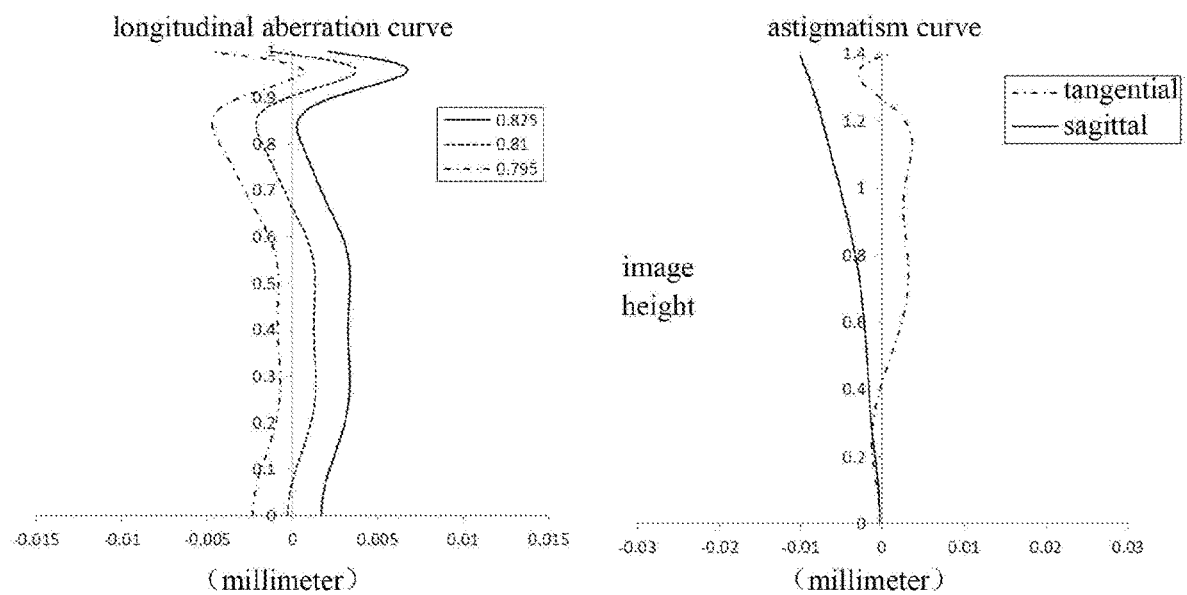

FIG. 6A illustrates a longitudinal aberration curve of the iris lens assembly according to Embodiment 3, representing deviations of focal points of light of different wavelengths converged after passing through the iris lens assembly. FIG. 6B illustrates an astigmatism curve of the iris lens assembly according to Embodiment 3, representing a curvature of a tangential plane and a curvature of a sagittal plane. FIG. 6C illustrates a distortion curve of the iris lens assembly according to Embodiment 3, representing amounts of distortion at different viewing angles. FIG. 6D illustrates a lateral color curve of the iris lens assembly according to Embodiment 3, representing deviations of different image heights on an image plane after light passes through the iris lens assembly. It can be seen from FIGS. 6A-6D that the iris lens assembly according to Embodiment 3 can achieve a good image quality.

Embodiment 4

An iris lens assembly according to Embodiment 4 of the present disclosure is described below with reference to FIGS. 7-8D. FIG. 7 is a schematic structural view illustrating the iris lens assembly according to Embodiment 4 of the present disclosure.

As shown in FIG. 7, the iris lens assembly includes, along an optical axis, three lenses L1-L3 arranged in sequence from an object side to an image plane. A first lens L1 has an object-side surface S1 and an image-side surface S2, a second lens L2 has an object-side surface S3 and an image-side surface S4, and a third lens L3 has an object-side surface S5 and an image-side surface S6. Alternatively, the iris lens assembly may further include an optical filter L4 having an object-side surface S7 and an image-side surface S8. The optical filter L4 is an infrared (IR) optical filter. A band-pass wave band of the optical filter may range from about 750 nm to about 900 nm, and the band-pass wave band of the optical filter may further range from about 790 nm to about 830 nm. In the iris lens assembly of this embodiment, an aperture diaphragm STO for limiting light beams may also be arranged between the object side and the first lens L1, to improve the image quality of the iris lens assembly.

Light from an object sequentially passes through the surfaces S1 to S8 and finally forms an image on the image plane S9.

Table 10 shows the surface type, the radius of curvature, the thickness, the material and the conic coefficient of each lens of the iris lens assembly in Embodiment 4. The radius of curvature and the thickness are shown in millimeters (mm) Table 11 shows high-order coefficients $A_4$, $A_6$, $A_8$, $A_{10}$, $A_{12}$, $A_{14}$, $A_{16}$, $A_{18}$ and $A_{20}$ that can be applied to each aspheric mirror surfaces S1-S6 in Embodiment 4. Table 12 shows the total effective focal length f of the iris lens assembly of Embodiment 4, the effective focal lengths f1-f3 of the lenses, the distance TTL from the object-side surface S1 of the first lens L1 to the image plane S9 on the optical axis, and half of the diagonal length ImgH of the effective pixel area on the image plane S9. A surface type of each aspheric surface may be defined by the formula (1) provided in Embodiment 1.

TABLE 10

| surface number | surface form | radius of curvature | thickness | material refractive index | abbe number | conic coefficient |
|---|---|---|---|---|---|---|
| OBJ | spherical | infinite | 260.0000 | | | |
| STO | spherical | infinite | −0.4827 | | | |
| S1 | aspheric | 1.0586 | 0.6544 | 1.53 | 55.8 | −0.1971 |
| S2 | aspheric | 3.9977 | 0.7161 | | | 11.1786 |
| S3 | aspheric | −2.1496 | 0.3431 | 1.62 | 23.5 | −98.9559 |
| S4 | aspheric | −17.3495 | 0.5190 | | | −99.0000 |
| S5 | aspheric | 8.0787 | 0.3890 | 1.53 | 55.8 | 19.8781 |
| S6 | aspheric | 3.9131 | 0.4684 | | | −5.3078 |
| S7 | spherical | infinite | 0.2100 | 1.52 | 64.2 | |
| S8 | spherical | infinite | 0.4000 | | | |
| S9 | spherical | infinite | | | | |

TABLE 11

| surface number | A4 | A6 | A8 | A10 | A12 |
|---|---|---|---|---|---|
| S1 | 1.2319E−02 | 3.7947E−02 | −1.9381E−01 | 1.0504E+00 | −3.2546E+00 |
| S2 | 3.0785E−02 | −2.2630E−02 | 1.2698E−01 | −4.5658E−01 | 6.0715E−01 |
| S3 | −9.9775E−01 | 1.1166E+01 | −1.1312E+02 | 8.7393E+02 | 4.9069E+03 |
| S4 | 5.4455E−01 | −4.7677E−01 | 3.5692E+00 | −3.3203E+01 | 1.6372E+02 |
| S5 | 1.5565E−01 | −5.2177E−01 | 2.1161E+00 | −6.7654E+00 | 1.5131E+01 |
| S6 | 4.9992E−02 | −5.6897E−01 | 2.0109E+00 | −4.9764E+00 | 8.1370E+00 |

| surface number | A14 | A16 | A18 | A20 |
|---|---|---|---|---|
| S1 | 6.3644E+00 | −7.5661E+00 | 5.0445E+00 | −1.4481E+00 |
| S2 | 3.3300E−01 | −2.4165E+00 | 3.1320E+00 | −1.4695E+00 |
| S3 | 1.8679E+04 | −4.5100E+04 | 6.1734E+04 | −3.6244E+04 |
| S4 | 4.3542E+02 | 5.3015E+02 | 4.6745E+01 | −3.2393E+02 |
| S5 | −2.1955E+01 | 1.9517E+01 | −9.6009E+00 | 1.9932E+00 |
| S6 | −8.3543E+00 | 5.0476E+00 | −1.5656E+00 | 1.7394E−01 |

TABLE 12

| parameter | | | | | |
|---|---|---|---|---|---|
| f(mm) | f1(mm) | f2(mm) | f3(mm) | TTL(mm) | ImgH(mm) |
| value 3.94 | 2.53 | −3.98 | −14.84 | 3.70 | 1.40 |

Figure 8A:
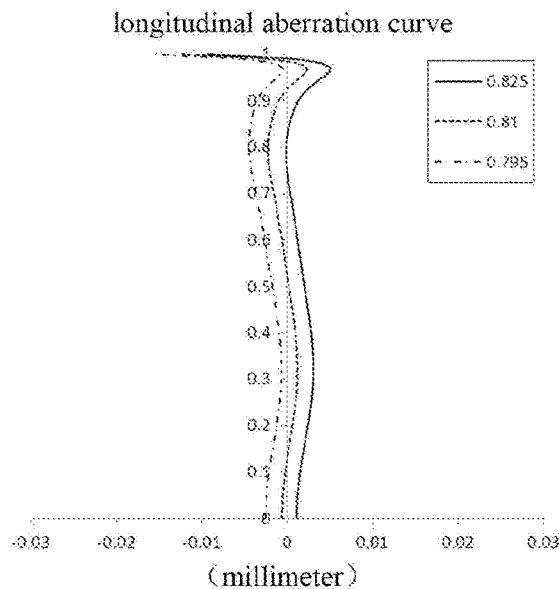
FIGS. 8A-8D illustrate a longitudinal aberration curve, an astigmatism curve, a distortion curve and a lateral color curve of the iris lens assembly according to Embodiment 4, respectively.
Figure 8B:
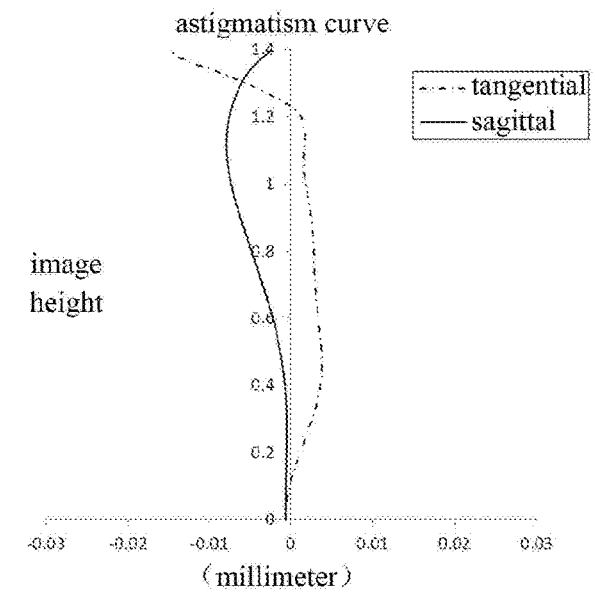
Figure 8C:
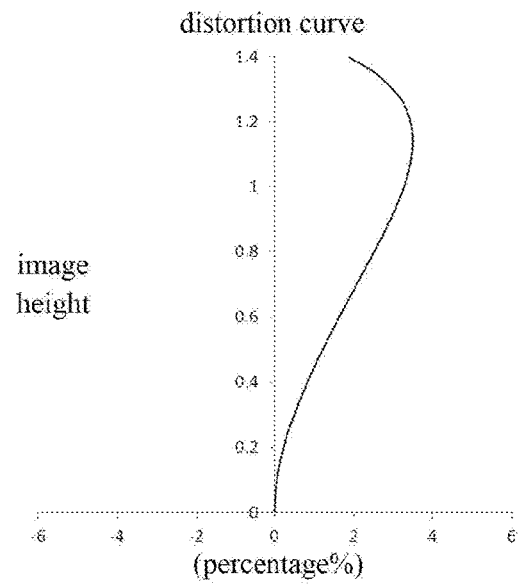
Figure 8D:
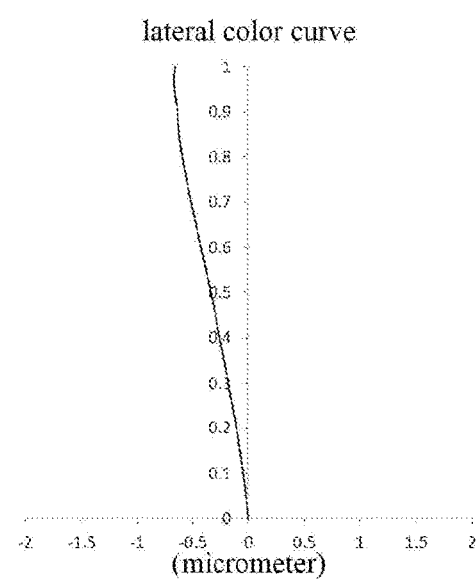

FIG. 8A illustrates a longitudinal aberration curve of the iris lens assembly according to Embodiment 4, representing deviations of focal points of light of different wavelengths converged after passing through the iris lens assembly. FIG. 8B illustrates an astigmatism curve of the iris lens assembly according to Embodiment 4, representing a curvature of a tangential plane and a curvature of a sagittal plane. FIG. 8C illustrates a distortion curve of the iris lens assembly according to Embodiment 4, representing amounts of distortion at different viewing angles. FIG. 8D illustrates a lateral color curve of the iris lens assembly according to Embodiment 4, representing deviations of different image heights on an image plane after light passes through the iris lens assembly. It can be seen from FIGS. 8A-8D that the iris lens assembly according to Embodiment 4 can achieve a good image quality.

Embodiment 5

An iris lens assembly according to Embodiment 5 of the present disclosure is described below with reference to FIGS. 9-10D. FIG. 9 is a schematic structural view illustrating the iris lens assembly according to Embodiment 5 of the present disclosure.

As shown in FIG. 9, the iris lens assembly includes, along an optical axis, three lenses L1-L3 arranged in sequence from an object side to an image plane. A first lens L1 has an object-side surface S1 and an image-side surface S2, a second lens L2 has an object-side surface S3 and an image-side surface S4, and a third lens L3 has an object-side surface S5 and an image-side surface S6. Alternatively, the iris lens assembly may further include an optical filter L4 having an object-side surface S7 and an image-side surface S8. The optical filter L4 is an infrared (IR) optical filter. A band-pass wave band of the optical filter may range from about 750 nm to about 900 nm, and the band-pass wave band of the optical filter may further range from about 790 nm to about 830 nm. In the iris lens assembly of this embodiment, an aperture diaphragm STO for limiting light beams may also be arranged between the object side and the first lens L1, to improve the image quality of the iris lens assembly. Light from an object sequentially passes through the surfaces S1 to S8 and finally forms an image on the image plane S9.

Table 13 shows the surface type, the radius of curvature, the thickness, the material and the conic coefficient of each lens of the iris lens assembly in Embodiment 5. The radius of curvature and the thickness are shown in millimeters (mm). Table 14 shows high-order coefficients $A_4$, $A_6$, $A_8$, $A_{10}$, $A_{12}$, $A_{14}$, $A_{16}$, $A_{18}$ and $A_{20}$ that can be applied to each aspheric mirror surfaces S1-S6 in Embodiment 5. Table 15 shows the total effective focal length f of the iris lens assembly of Embodiment 5, the effective focal lengths f1-f3 of the lenses, the distance TTL from the object-side surface S1 of the first lens L1 to the image plane S9 on the optical axis, and half of the diagonal length ImgH of the effective pixel area on the image plane S9. A surface type of each aspheric surface may be defined by the formula (1) provided in Embodiment 1.

FIG. 10A illustrates a longitudinal aberration curve of the iris lens assembly according to Embodiment 5, representing deviations of focal points of light of different wavelengths converged after passing through the iris lens assembly. FIG. 10B illustrates an astigmatism curve of the iris lens assembly according to Embodiment 5, representing a curvature of a tangential plane and a curvature of a sagittal plane. FIG. 10C illustrates a distortion curve of the iris lens assembly according to Embodiment 5, representing amounts of distortion at different viewing angles. FIG. 10D illustrates a lateral color curve of the iris lens assembly according to Embodiment 5, representing deviations of different image heights on an image plane after light passes through the iris lens assembly. It can be seen from FIGS. 10A-10D that the iris lens assembly according to Embodiment 5 can achieve a good image quality.

Embodiment 6

An iris lens assembly according to Embodiment 6 of the present disclosure is described below with reference to FIGS. 11-12D. FIG. 11 is a schematic structural view illustrating the iris lens assembly according to Embodiment 6 of the present disclosure.

As shown in FIG. 11, the iris lens assembly includes, along an optical axis, three lenses L1-L3 arranged in sequence from an object side to an image plane. A first lens L1 has an object-side surface S1 and an image-side surface S2, a second lens L2 has an object-side surface S3 and an image-side surface S4, and a third lens L3 has an object-side

TABLE 13

| surface number | surface form | radius of curvature | thickness | material refractive index | abbe number | conic coefficient |
|---|---|---|---|---|---|---|
| OBJ | spherical | infinite | 260.0000 | | | |
| STO | spherical | infinite | −0.5256 | | | |
| S1 | aspheric | 1.0644 | 0.7075 | 1.53 | 55.8 | −0.1853 |
| S2 | aspheric | 3.3249 | 0.7924 | | | 9.7285 |
| S3 | aspheric | −2.5045 | 0.2400 | 1.62 | 23.5 | −78.1820 |
| S4 | aspheric | −16.2944 | 0.6220 | | | 50.0000 |
| S5 | aspheric | −7.5709 | 0.3199 | 1.62 | 23.5 | 39.3841 |
| S6 | aspheric | 23.9415 | 0.4083 | | | −99.0000 |
| S7 | spherical | infinite | 0.2100 | 1.52 | 64.2 | |
| S8 | spherical | infinite | 0.4044 | | | |
| S9 | spherical | infinite | | | | |

TABLE 14

| surface number | A4 | A6 | A8 | A10 | A12 |
|---|---|---|---|---|---|
| S1 | 6.4373E−03 | 1.1060E−02 | 1.0444E−02 | −1.0068E−01 | 6.1096E−01 |
| S3 | 8.5637E−03 | −5.3013E−02 | 4.5690E−01 | −2.4941E+00 | 8.1190E+00 |
| S3 | −5.4988E−01 | 2.5925E+00 | −7.3881E+00 | −8.4448E+01 | 1.2391E+03 |
| S4 | 2.9879E−01 | 3.7091E−01 | −5.6792E+00 | 5.5719E+01 | −3.6700E+02 |
| S5 | −6.2743E−02 | −1.7467E−01 | 2.1395E+00 | −9.2376E+00 | 2.3462E+01 |
| S6 | −1.5806E−01 | 7.1017E−02 | −1.6705E−01 | 7.1681E−01 | −2.2253E+00 |

| surface number | A14 | A16 | A18 | A20 |
|---|---|---|---|---|
| S1 | −1.6940E+00 | 2.5970E+00 | −2.0708E+00 | 6.8751E−01 |
| S3 | −1.6155E+01 | 1.9035E+01 | −1.2033E+01 | 3.1188E+00 |
| S3 | −7.9092E+03 | 2.7989E+04 | −5.2971E+04 | 4.1800E+04 |
| S4 | 1.5390E+03 | −3.9560E+03 | 5.6648E+03 | −3.4498E+03 |
| S5 | −3.6013E+01 | 3.2593E+01 | −1.5920E+01 | 3.2208E+00 |
| S6 | 4.0323E+00 | −4.1462E+00 | 2.2389E+00 | −4.9156E−01 |

TABLE 15

| | parameter | | | | | |
|---|---|---|---|---|---|---|
| | f(mm) | f1(mm) | f2(mm) | f3(mm) | TTL(mm) | ImgH(mm) |
| value | 4.08 | 2.67 | −4.79 | −9.21 | 3.70 | 1.45 | surface S5 and an image-side surface S6. Alternatively, the iris lens assembly may further include an optical filter L4 having an object-side surface S7 and an image-side surface S8. The optical filter L4 is an infrared (IR) optical filter. A band-pass wave band of the optical filter may range from about 750 nm to about 900 nm, and the band-pass wave band of the optical filter may further range from about 790 nm to about 830 nm. In the iris lens assembly of this embodiment, an aperture diaphragm STO for limiting light beams may also be arranged between the object side and the first lens L1, to improve the image quality of the iris lens assembly. Light from an object sequentially passes through the surfaces S1 to S8 and finally forms an image on the image plane S9.

Table 16 shows the surface type, the radius of curvature, the thickness, the material and the conic coefficient of each lens of the iris lens assembly in Embodiment 6. The radius of curvature and the thickness are shown in millimeters (mm). Table 17 shows high-order coefficients $A_4$, $A_6$, $A_8$, $A_{10}$, $A_{12}$, $A_{14}$, $A_{16}$, $A_{18}$ and $A_{20}$ that can be applied to each aspheric mirror surfaces S1-S6 in Embodiment 6. Table 18 shows the total effective focal length f of the iris lens assembly of Embodiment 6, the effective focal lengths f1-f3 of the lenses, the distance TTL from the object-side surface S1 of the first lens L1 to the image plane S9 on the optical axis, and half of the diagonal length ImgH of the effective pixel area on the image plane S9. A surface type of each aspheric surface may be defined by the formula (1) provided in Embodiment 1.

TABLE 18

| | parameter | | | | |
|---|---|---|---|---|---|
| | f(mm) | f1(mm) | f2(mm) | f3(mm) | TTL(mm) | ImgH(mm) |
| value | 4.08 | 2.63 | −2.97 | 115.63 | 3.70 | 1.45 |

Figure 12A:
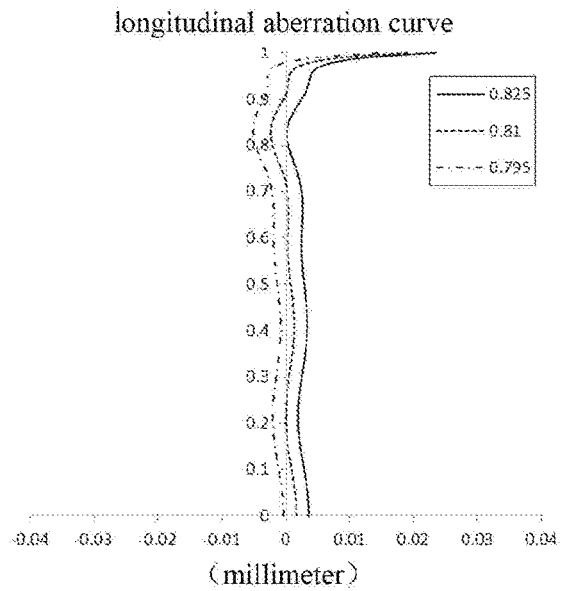
FIGS. 12A-12D illustrate a longitudinal aberration curve, an astigmatism curve, a distortion curve and a lateral color curve of the iris lens assembly according to Embodiment 6, respectively.
Figure 12B:
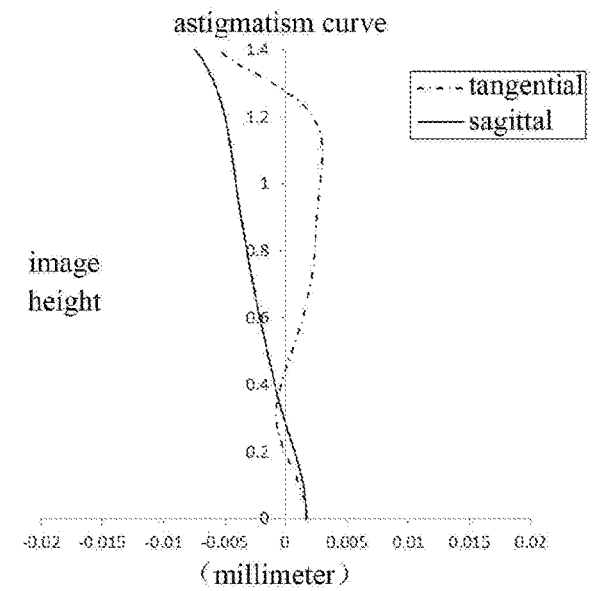
Figure 12C:
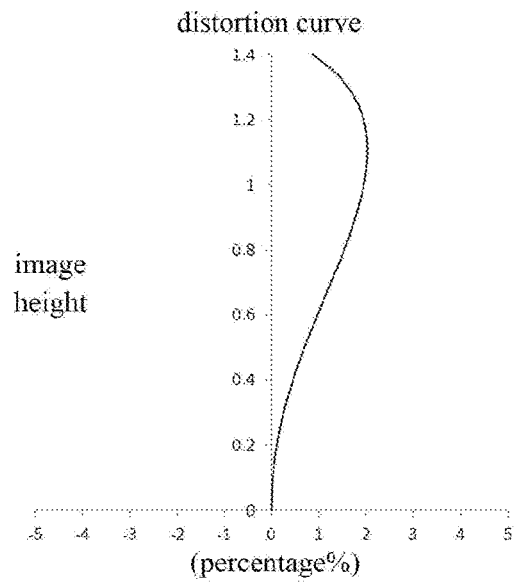
Figure 12D:
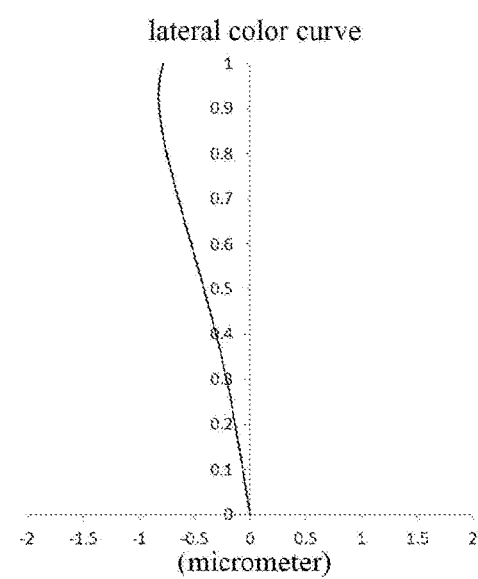

FIG. 12A illustrates a longitudinal aberration curve of the iris lens assembly according to Embodiment 6, representing deviations of focal points of light of different wavelengths converged after passing through the iris lens assembly. FIG. 12B illustrates an astigmatism curve of the iris lens assembly according to Embodiment 6, representing a curvature of a tangential plane and a curvature of a sagittal plane. FIG. 12C illustrates a distortion curve of the iris lens assembly according to Embodiment 6, representing amounts of distortion at different viewing angles. FIG. 12D illustrates a lateral color curve of the iris lens assembly according to Embodiment 6, representing deviations of different image heights on an image plane after light passes through the iris lens assembly. It can be seen from FIGS. 12A-12D that the iris lens assembly according to Embodiment 6 can achieve a good image quality.

Embodiment 7

An iris lens assembly according to Embodiment 7 of the present disclosure is described below with reference to

TABLE 16

| surface number | surface form | radius of curvature | thickness | material refractive index | abbe number | conic coefficient |
|---|---|---|---|---|---|---|
| OBJ | spherical | infinite | 260.0000 | | | |
| STO | spherical | infinite | −0.5406 | | | |
| S1 | aspheric | 1.0428 | 0.6833 | 1.53 | 55.8 | −0.1928 |
| S2 | aspheric | 3.2176 | 0.8420 | | | 8.0953 |
| S3 | aspheric | −3.9183 | 0.2400 | 1.62 | 23.5 | −24.2360 |
| S4 | aspheric | 3.5788 | 0.4526 | | | −99.0000 |
| S5 | aspheric | 5.2361 | 0.4099 | 1.53 | 55.8 | −22.9938 |
| S6 | aspheric | 5.5719 | 0.4623 | | | 14.1828 |
| S7 | spherical | infinite | 0.2100 | 1.52 | 64.2 | |
| S8 | spherical | infinite | 0.4044 | | | |
| S9 | spherical | infinite | | | | |

TABLE 17

| surface number | A4 | A6 | A8 | A10 | A12 |
|---|---|---|---|---|---|
| S1 | 8.0643E−03 | −1.8880E−02 | 1.8767E−01 | −6.0247E−01 | 1.0816E+00 |
| S2 | −5.6262E−04 | 1.2301E−02 | −1.3183E−01 | 3.8361E−01 | −6.3266E−01 |
| S3 | −3.4851E−01 | −6.3813E−01 | 9.7289E+00 | −1.5732E+02 | 1.4515E+03 |
| S4 | 2.4799E−01 | −4.1124E−01 | −3.6068E+00 | 5.0798E+01 | −3.2346E+02 |
| S5 | −6.2116E−02 | 7.8418E−02 | 9.8898E−02 | −2.5247E−01 | 2.8240E−01 |
| S6 | −1.6758E−01 | 4.6590E−02 | −5.5523E−02 | 1.8956E−01 | −3.8771E−01 |

| surface number | A14 | A16 | A18 | A20 |
|---|---|---|---|---|
| S1 | −9.7394E−01 | 3.6385E−01 | 0.0000E+00 | 0.0000E+00 |
| S2 | 5.0336E−01 | −1.4563E−01 | 0.0000E+00 | 0.0000E+00 |
| S3 | −8.2568E+03 | 2.8087E+04 | −5.2495E+04 | 4.1423E+04 |
| S4 | 1.2185E+03 | −2.7690E+03 | 3.5081E+03 | −1.9011E+03 |
| S5 | −2.7502E−01 | 1.9632E−01 | −6.3552E−02 | 2.7381E−03 |
| S6 | 4.7681E−01 | −3.6868E−01 | 1.6241E−01 | −3.0356E−02 |

Figures 14C, 14D:
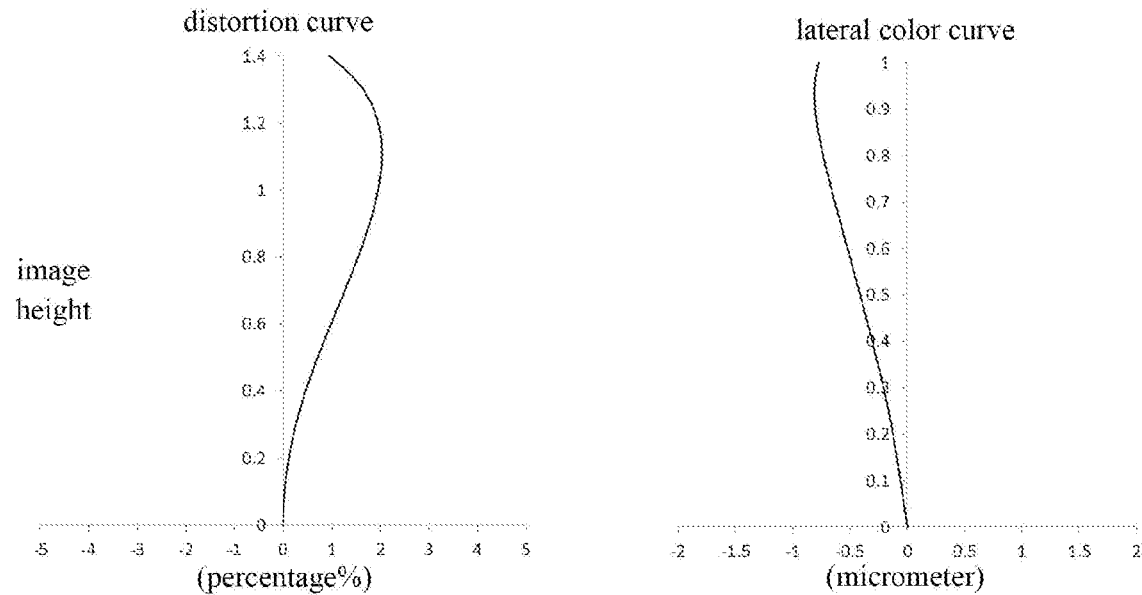

FIGS. 13-14D. FIG. 13 is a schematic structural view illustrating the iris lens assembly according to Embodiment 7 of the present disclosure.

As shown in FIG. 13, the iris lens assembly includes, along an optical axis, three lenses L1-L3 arranged in sequence from an object side to an image plane. A first lens L1 has an object-side surface S1 and an image-side surface S2, a second lens L2 has an object-side surface S3 and an image-side surface S4, and a third lens L3 has an object-side surface S5 and an image-side surface S6. Alternatively, the iris lens assembly may further include an optical filter L4 having an object-side surface S7 and an image-side surface S8. The optical filter L4 is an infrared (IR) optical filter. A band-pass wave band of the optical filter may range from about 750 nm to about 900 nm, and the band-pass wave band of the optical filter may further range from about 790 nm to about 830 nm. In the iris lens assembly of this embodiment, an aperture diaphragm STO for limiting light beams may also be arranged between the object side and the first lens L1, to improve the image quality of the iris lens assembly. Light from an object sequentially passes through the surfaces S1 to S8 and finally forms an image on the image plane S9.

Table 19 shows the surface type, the radius of curvature, the thickness, the material and the conic coefficient of each lens of the iris lens assembly in Embodiment 7. The radius of curvature and the thickness are shown in millimeters (mm). Table 20 shows high-order coefficients $A_4$, $A_6$, $A_8$, $A_{10}$, $A_{12}$, $A_{14}$, $A_{16}$, $A_{18}$ and $A_{20}$ that can be applied to each aspheric mirror surfaces S1-S6 in Embodiment 7. Table 21 shows the total effective focal length f of the iris lens assembly of Embodiment 7, the effective focal lengths f1-f3 of the lenses, the distance TTL from the object-side surface S1 of the first lens L1 to the image plane S9 on the optical axis, and half of the diagonal length ImgH of the effective pixel area on the image plane S9. A surface type of each aspheric surface may be defined by the formula (1) provided in Embodiment 1.

TABLE 19

| surface number | surface form | radius of curvature | thickness | material refractive index | abbe number | conic coefficient |
|---|---|---|---|---|---|---|
| OBJ | spherical | infinite | 260.0000 | | | |
| STO | spherical | infinite | −0.5217 | | | |
| S1 | aspheric | 1.0577 | 0.6698 | 1.53 | 55.8 | −0.1987 |
| S2 | aspheric | 3.2937 | 0.8261 | | | 7.9914 |
| S3 | aspheric | 109.1388 | 0.2400 | 1.62 | 23.5 | 50.0000 |
| S4 | aspheric | 1.9937 | 0.4977 | | | −39.8432 |
| S5 | aspheric | 19.2516 | 0.4205 | 1.53 | 55.8 | −99.0000 |
| S6 | aspheric | 11.9956 | 0.4359 | | | −11.3624 |
| S7 | spherical | infinite | 0.2100 | 1.52 | 64.2 | |
| S8 | spherical | infinite | 0.4043 | | | |
| S9 | spherical | infinite | | | | |

TABLE 20

| surface number | A4 | A6 | A8 | A10 | A12 |
|---|---|---|---|---|---|
| S1 | 6.9669E−03 | −5.4172E−03 | 9.8510E−02 | −3.1669E−01 | 5.7546E−01 |
| S2 | −1.6236E−03 | 1.1014E−02 | −1.3186E−01 | 3.8565E−01 | −6.3021E−01 |
| S3 | −3.2833E−01 | −6.0600E−02 | −3.6752E+00 | 1.0216E+01 | 1.6359E+02 |
| S4 | 5.7321E−01 | −2.3752E+00 | 7.3030E+00 | −2.0133E+00 | −1.3303E+02 |
| S5 | −6.4829E−02 | 7.4466E−03 | 5.5089E−01 | −1.8560E+00 | 3.8020E+00 |
| S6 | −1.5443E−01 | 4.4545E−02 | −1.4403E−01 | 5.4358E−01 | −1.2133E+00 |

| surface number | A14 | A16 | A18 | A20 |
|---|---|---|---|---|
| S1 | −5.1187E−01 | 1.8913E−01 | 0.0000E+00 | 0.0000E+00 |
| S2 | 5.0268E−01 | −1.6002E−01 | 0.0000E+00 | 0.0000E+00 |
| S3 | −2.0617E+03 | 9.9725E+03 | −2.3013E+04 | 2.0915E+04 |
| S4 | 7.5692E+02 | −2.0879E+03 | 2.9933E+03 | −1.7764E+03 |
| S5 | −5.0604E+00 | 4.0427E+00 | −1.7219E+00 | 2.9596E−01 |
| S6 | 1.6117E+00 | −1.2748E+00 | 5.4630E−01 | −9.6715E−02 |

TABLE 21

| | f(mm) | f1(mm) | f2(mm) | f3(mm) | TTL(mm) | ImgH(mm) |
|---|---|---|---|---|---|---|
| parameter | | | | | | |
| value | 4.08 | 2.67 | −3.27 | −61.48 | 3.70 | 1.45 |

FIG. 14A illustrates a longitudinal aberration curve of the iris lens assembly according to Embodiment 7, representing deviations of focal points of light of different wavelengths converged after passing through the iris lens assembly. FIG. 14B illustrates an astigmatism curve of the iris lens assembly according to Embodiment 7, representing a curvature of a tangential plane and a curvature of a sagittal plane. FIG. 14C illustrates a distortion curve of the iris lens assembly according to Embodiment 7, representing amounts of distortion at different viewing angles. FIG. 14D illustrates a lateral color curve of the iris lens assembly according to Embodiment 7, representing deviations of different image heights on an image plane after light passes through the iris lens assembly. It can be seen from FIGS. 14A-14D that the iris lens assembly according to Embodiment 7 can achieve a good image quality.

Embodiment 8

Figure 15:
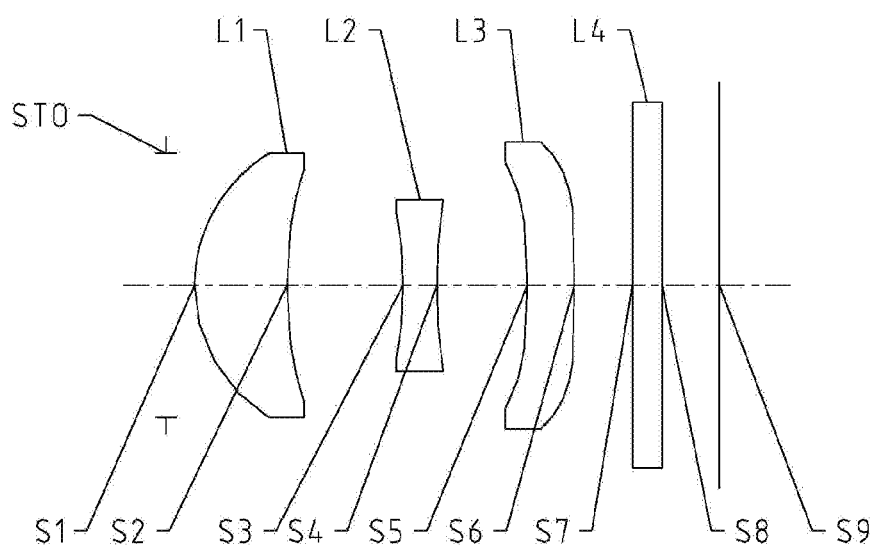
FIG. 15 is a schematic structural view illustrating an iris lens assembly according to Embodiment 8 of the present disclosure.

An iris lens assembly according to Embodiment 8 of the present disclosure is described below with reference to FIGS. 15-16D. FIG. 15 is a schematic structural view illustrating the iris lens assembly according to Embodiment 8 of the present disclosure.

As shown in FIG. 15, the iris lens assembly includes, along an optical axis, three lenses L1-L3 arranged in sequence from an object side to an image plane. A first lens L1 has an object-side surface S1 and an image-side surface S2, a second lens L2 has an object-side surface S3 and an image-side surface S4, and a third lens L3 has an object-side surface S5 and an image-side surface S6. Alternatively, the iris lens assembly may further include an optical filter L4 having an object-side surface S7 and an image-side surface S8. The optical filter L4 is an infrared (IR) optical filter. A band-pass wave band of the optical filter may range from about 750 nm to about 900 nm, and the band-pass wave band of the optical filter may further range from about 790 nm to about 830 nm. In the iris lens assembly of this embodiment, an aperture diaphragm STO for limiting light beams may also be arranged between the object side and the first lens L1, to improve the image quality of the iris lens assembly. Light from an object sequentially passes through the surfaces S1 to S8 and finally forms an image on the image plane S9.

Table 22 shows the surface type, the radius of curvature, the thickness, the material and the conic coefficient of each lens of the iris lens assembly in Embodiment 8. The radius of curvature and the thickness are shown in millimeters (mm). Table 23 shows high-order coefficients $A_4$, $A_6$, $A_8$, $A_{10}$, $A_{12}$, $A_{14}$, $A_{16}$, $A_{18}$ and $A_{20}$ that can be applied to each aspheric mirror surfaces S1-S6 in Embodiment 8. Table 24 shows the total effective focal length f of the iris lens assembly of Embodiment 8, the effective focal lengths f1-f3 of the lenses, the distance TTL from the object-side surface S1 of the first lens L1 to the image plane S9 on the optical axis, and half of the diagonal length ImgH of the effective pixel area on the image plane 9. A surface type of each aspheric surface may be defined by the formula (i) provided in Embodiment 1.

TABLE 22

| surface number | surface form | radius of curvature | thickness | material refractive index | abbe number | conic coefficient |
|---|---|---|---|---|---|---|
| OBJ | spherical | infinite | 260.0000 | | | |
| STO | spherical | infinite | 0.2000 | | | |
| S1 | aspheric | 1.0797 | 0.6526 | 1.53 | 55.8 | −0.1889 |
| S2 | aspheric | 3.3396 | 0.8187 | | | 8.1297 |
| S3 | aspheric | −4.9229 | 0.2400 | 1.53 | 55.8 | −87.1979 |
| S4 | aspheric | 5.5747 | 0.6385 | | | −99.0000 |
| S5 | aspheric | −8.8702 | 0.3307 | 1.53 | 55.8 | 49.9990 |
| S6 | aspheric | 16.5497 | 0.4095 | | | −99.0000 |
| S7 | spherical | infinite | 0.2100 | 1.52 | 64.2 | |
| S8 | spherical | infinite | 0.4051 | | | |
| S9 | spherical | infinite | | | | |

TABLE 23

| surface number | A4 | A6 | A8 | A10 | A12 |
|---|---|---|---|---|---|
| S1 | 8.0611E−03 | −1.8992E−02 | 1.8570E−01 | −5.8486E−01 | 1.0407E+00 |
| S2 | −2.2001E−03 | 1.9288E−02 | −1.3183E−01 | 3.8266E−01 | −6.2426E−01 |
| S3 | −3.2833E−01 | −6.0600E−02 | −3.6752E+00 | 1.0216E+01 | 1.6359E+02 |
| S4 | 5.7321E−01 | −2.3752E+00 | 7.3030E+00 | −2.0133E+00 | −1.3303E+02 |
| S5 | −6.4829E−02 | 7.4466E−03 | 5.5089E−01 | −1.8560E+00 | 3.8020E+00 |
| S6 | −1.5443E−01 | 4.4545E−02 | −1.4403E−01 | 5.4358E−01 | −1.2133E+00 |

| surface number | A14 | A16 | A18 | A20 |
|---|---|---|---|---|
| S1 | −9.3072E−01 | 3.4685E−01 | 0.0000E+00 | 0.0000E+00 |
| S2 | 5.1899E−01 | −1.6220E−01 | 0.0000E+00 | 0.0000E+00 |
| S3 | −2.0617E+03 | 9.9725E+03 | −2.3013E+04 | 2.0915E+04 |

TABLE 23-continued

| | | | | |
|---|---|---|---|---|
| S4 | 7.5692E+02 | −2.0879E+03 | 2.9933E+03 | −1.7764E+03 |
| S5 | −5.0604E+00 | 4.0427E+00 | −1.7219E+00 | 2.9596E−01 |
| S6 | 1.6117E+00 | −1.2748E+00 | 5.4630E−01 | −9.6715E−02 |

TABLE 24

| | parameter | | | | |
|---|---|---|---|---|---|
| | f(mm) | f1(mm) | f2(mm) | f3(mm) | TTL(mm) | ImgH(mm) |
| value | 4.07 | 2.75 | −4.91 | −10.88 | 3.71 | 1.45 |

Figure 16A:
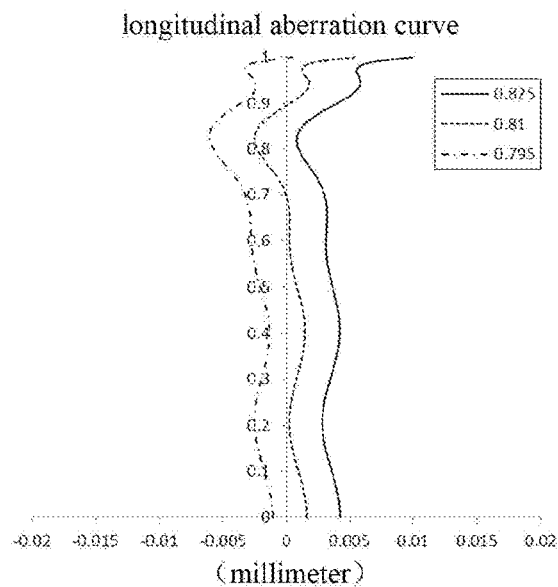
FIGS. 16A-16D illustrate a longitudinal aberration curve, an astigmatism curve, a distortion curve and a lateral color curve of the iris lens assembly according to Embodiment 8, respectively.
Figure 16B:
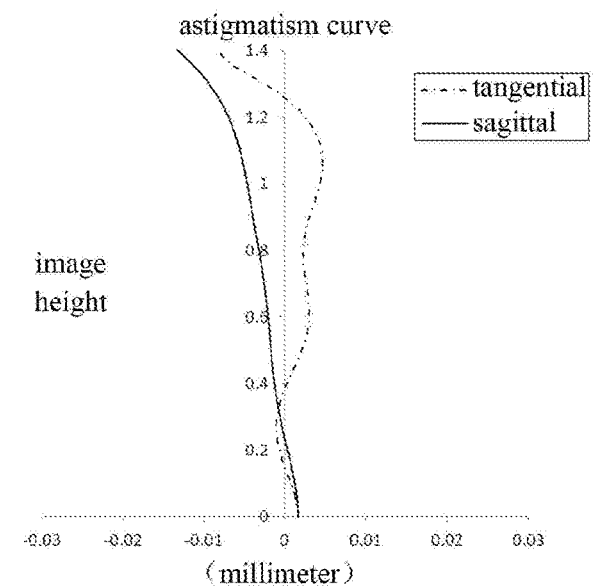
Figure 16C:
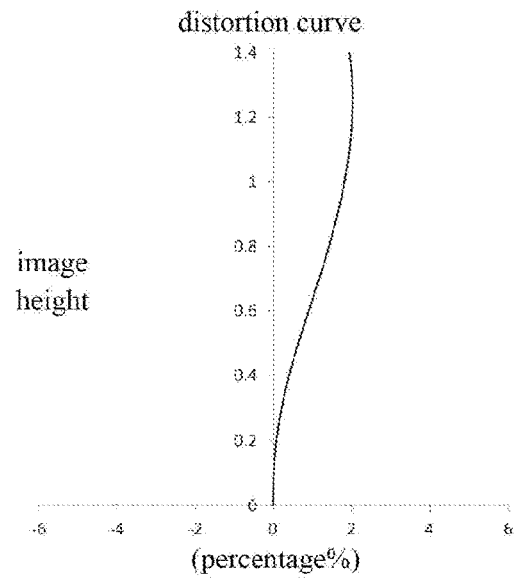
Figure 16D:
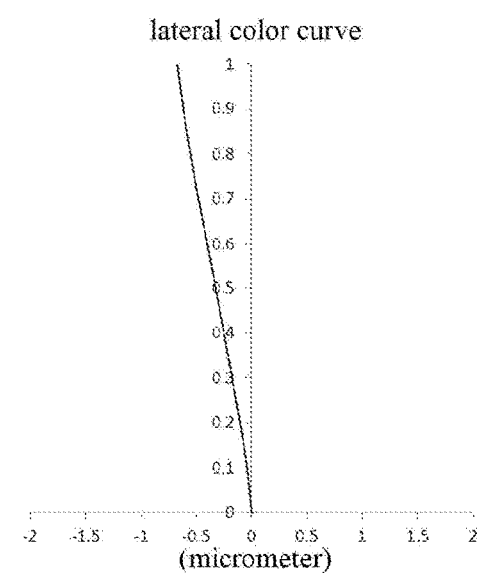

FIG. 16A illustrates a longitudinal aberration curve of the iris lens assembly according to Embodiment 8, representing deviations of focal points of light of different wavelengths converged after passing through the iris lens assembly. FIG. 16B illustrates an astigmatism curve of the iris lens assembly according to Embodiment 8, representing a curvature of a tangential plane and a curvature of a sagittal plane. FIG. 16C illustrates a distortion curve of the iris lens assembly according to Embodiment 8, representing amounts of distortion at different viewing angles. FIG. 16D illustrates a lateral color curve of the iris lens assembly according to Embodiment 8, representing deviations of different image heights on an image plane after light passes through the iris lens assembly. It can be seen from FIGS. 16A-16D that the iris lens assembly according to Embodiment 8 can achieve a good image quality.

From the above, Embodiment 1 to Embodiment 8 respectively satisfy the relations shown in Table 25 below.

TABLE 25

| Formula | Embodiment | | | | | | | |
|---|---|---|---|---|---|---|---|---|
| | 1 | 2 | 3 | 4 | 5 | 6 | 7 | 8 |
| SL/TTL | 0.87 | 0.87 | 0.87 | 0.87 | 0.86 | 0.85 | 0.86 | 1.05 |
| CT1/(CT2 + CT3) | 1.15 | 1.11 | 1.12 | 0.89 | 1.26 | 1.05 | 1.01 | 1.14 |
| TTL/ImgH | 2.50 | 2.50 | 2.50 | 2.64 | 2.56 | 2.56 | 2.56 | 2.56 |
| TTL/f | 0.88 | 0.88 | 0.88 | 0.94 | 0.91 | 0.91 | 0.91 | 0.91 |
| CT1/CT2 | 2.55 | 2.56 | 2.57 | 1.91 | 2.95 | 2.85 | 2.79 | 2.72 |
| ΣCT/TTL | 0.33 | 0.33 | 0.33 | 0.37 | 0.34 | 0.36 | 0.36 | 0.33 |
| R2/f1 | 1.31 | 1.28 | 1.27 | 1.58 | 1.24 | 1.22 | 1.23 | 1.22 |
| |SAG32/CT3| | 0.14 | 0.26 | 0.27 | 0.20 | 0.46 | 0.16 | 0.36 | 0.72 |
| f1/f2 | −0.68 | −0.66 | −0.65 | −0.64 | −0.56 | −0.89 | −0.82 | −0.56 |
| DT11/DT22 | 1.53 | 1.50 | 1.50 | 1.51 | 1.55 | 1.47 | 1.51 | 1.56 |

The present disclosure further provides a camera device having a photosensitive element which may be a photosensitive charge-coupled device (CCD) or a complementary metal-oxide semiconductor (CMOS) element. The camera device may be an independent camera device such as a digital camera, or may be a camera module integrated in a mobile electronic device such as a mobile phone. The camera device is equipped with the iris lens assembly described above.

The foregoing descriptions are merely illustrations for the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, for example, technical solutions formed by replacing the above features as disclosed in the present disclosure with (but not limited to) technical features having similar functions.

What is claimed is:

1. An iris lens assembly, having a total effective focal length f, and the iris lens assembly comprising sequentially a first lens, a second lens and a third lens from an object side to an image plane along an optical axis, wherein,
   the first lens has a positive refractive power, and an object-side surface of the first lens is a convex surface;
   each of the second lens and the third lens has a positive refractive power or a negative refractive power; and
   a distance TTL from the object-side surface of the first lens to the image plane on the optical axis and the total effective focal length f satisfy 0.7<TTL/f<1.1,
   wherein a distance SAG32 from an intersection point of an image-side surface of the third lens and the optical axis to an effective radius vertex of the image-side surface of the third lens on the optical axis, and a center thickness CT3 of the third lens on the optical axis satisfy 0.1<|SAG32/CT3|<0.8.

2. The iris lens assembly according to claim 1, further comprising an aperture diaphragm arranged between the object side and the first lens,
   wherein a distance SL from the aperture diaphragm to the image plane on the optical axis and the distance TTL from the object-side surface of the first lens to the image plane on the optical axis satisfy 0.70<SL/TTL<1.25.

3. The iris lens assembly according to claim 1, wherein a center thickness CT1 of the first lens on the optical axis, a center thickness CT2 of the second lens on the optical axis and a center thickness CT3 of the third lens on the optical axis satisfy 0.8<CT1/(CT2+CT3)<1.3.

4. The iris lens assembly according to claim 1, wherein a center thickness CT1 of the first lens on the optical axis and a center thickness CT2 of the second lens on the optical axis satisfy 1.7<CT1/CT2<3.

5. The iris lens assembly according to claim 1, wherein the iris lens assembly further comprises an infrared (IR) optical filter arranged between the third lens and the image plane, wherein a band-pass wave band of the infrared (IR) optical filter ranges from 750 nm to 900 nm.

6. The iris lens assembly according to claim 1, wherein the second lens has a negative refractive power, and an effective focal length f1 of the first lens and an effective focal length f2 of the second lens satisfy −0.9<f1/f2<−0.2.

7. The iris lens assembly according to claim 1, wherein an effective radius DT11 of the object-side surface of the first lens and an effective radius DT22 of an image-side surface of the second lens satisfy 1.2<DT11/DT22<1.8.

8. The iris lens assembly according to claim 1, wherein the band-pass wave band of the infrared (IR) optical filter ranges from 790 nm to 830 nm.

9. An iris lens assembly, comprising sequentially a first lens, a second lens, and a third lens from an object side to an image plane along an optical axis, wherein
the first lens has a positive refractive power, and an object-side surface of the first lens is a convex surface;
each of the second lens and the third lens has a positive refractive power or a negative refractive power; and
a center thickness CT1 of the first lens on the optical axis and a center thickness CT2 of the second lens on the optical axis satisfy 1.7<CT1/CT2<3,
wherein an effective radius DT11 of the object-side surface of the first lens and an effective radius DT22 of an image-side surface of the second lens satisfy 1.2<DT11/DT22<1.8.

10. The iris lens assembly according to claim 9, wherein a sum of a center thickness ΣCT of the first lens to the third lens on the optical axis, and the distance TTL from the object-side surface of the first lens to the image plane on the optical axis satisfy ΣCT/TTL<0.4.

11. The iris lens assembly according to claim 9, wherein an image-side surface of the first lens is a concave surface, and a radius of curvature R2 of the image-side surface of the first lens and an effective focal length f1 of the first lens satisfy 1.2<R2/f1<1.7.

12. The iris lens assembly according to claim 9, wherein the second lens has a negative refractive power, and an effective focal length f1 of the first lens and an effective focal length f2 of the second lens satisfy −0.9<f1/f2<−0.2.

13. An iris lens assembly, comprising sequentially a first lens, a second lens and a third lens from an object side to an image plane along an optical axis, wherein
the first lens has a positive refractive power, and an object-side surface of the first lens is a convex surface;
each of the second lens and the third lens have a positive refractive power or a negative refractive power; and
a distance SAG32 from an intersection point of an image-side surface of the third lens and the optical axis to an effective radius vertex of the image-side surface of the third lens on the optical axis, and a center thickness CT3 of the third lens on the optical axis satisfy 0.1<|SAG32/CT3|<0.8,
wherein an effective radius DT11 of the object-side surface of the first lens, and an effective radius DT22 of an image-side surface of the second lens satisfy 1.2<DT11/DT22<1.8.

14. The iris lens assembly according to claim 13, wherein a sum of a center thickness ΣCT of the first lens to the third lens on the optical axis, and a distance TTL from the object-side surface of the first lens to the image plane on the optical axis satisfy ΣCT/TTL<0.4.

15. The iris lens assembly according to claim 14, wherein a center thickness CT1 of the first lens on the optical axis, a center thickness CT2 of the second lens on the optical axis and a center thickness CT3 of the third lens on the optical axis satisfy 0.8<CT1/(CT2+CT3)<1.3.

16. The iris lens assembly according to claim 14, further comprising an aperture diaphragm arranged between the object side and the first lens,
wherein a distance SL from the aperture diaphragm to the image plane on the optical axis, and the distance TTL from the object-side surface of the first lens to the image plane on the optical axis satisfy 0.70<SL/TTL<1.25.

17. The iris lens assembly according to claim 16, wherein the distance TTL from the object-side surface of the first lens to the image plane on the optical axis, and half of a diagonal length ImgH of an effective pixel area of an electronic photosensitive element on the image plane satisfy TTL/ImgH≤2.65.

18. The iris lens assembly according to claim 17, wherein an image-side surface of the first lens is a concave surface, and a radius of curvature R2 of the image-side surface of the first lens and an effective focal length f1 of the first lens satisfy 1.2<R2/f1<1.7.

19. The iris lens assembly according to claim 17, wherein the second lens has a negative refractive power, and the effective focal length f1 of the first lens and an effective focal length f2 of the second lens satisfy −0.9<f1/f2<−0.2.

20. The iris lens assembly according to claim 19, wherein the iris lens assembly further comprises an infrared (IR) optical filter arranged between the third lens and the image plane, wherein a band-pass wave band of the infrared (IR) optical filter ranges from 750 nm to 900 nm.

* * * * *